United States Patent
Hill

(10) Patent No.: US 7,495,769 B2
(45) Date of Patent: Feb. 24, 2009

(54) APPARATUS AND METHOD FOR JOINT MEASUREMENTS OF CONJUGATED QUADRATURES OF FIELDS OF REFLECTED/SCATTERED AND TRANSMITTED BEAMS BY AN OBJECT IN INTERFEROMETRY

(75) Inventor: Henry A. Hill, Tucson, AZ (US)

(73) Assignee: Zetetic Institute, Tucson, AZ (US)

( * ) Notice: Subject to any disclaimer, the term of this patent is extended or adjusted under 35 U.S.C. 154(b) by 0 days.

(21) Appl. No.: 12/023,803

(22) Filed: Jan. 31, 2008

(65) Prior Publication Data

US 2008/0180682 A1      Jul. 31, 2008

Related U.S. Application Data

(62) Division of application No. 10/765,368, filed on Jan. 27, 2004, now abandoned.

(60) Provisional application No. 60/442,892, filed on Jan. 28, 2003, provisional application No. 60/442,858, filed on Jan. 27, 2003.

(51) Int. Cl.
    *G01B 11/02* (2006.01)
(52) U.S. Cl. .................................. 356/489; 356/511
(58) Field of Classification Search ................ 359/300; 356/489, 495, 511–516
    See application file for complete search history.

(56) References Cited

U.S. PATENT DOCUMENTS

| | | |
|---|---|---|
| 3,628,027 A | 12/1971 | Brauss |
| 4,011,011 A | 3/1977 | Hemstreet et al. |
| 4,226,501 A | 10/1980 | Shafer |
| 4,272,684 A | 6/1981 | Seachman |
| 4,685,803 A | 8/1987 | Sommargren |
| 4,733,967 A | 3/1988 | Sommargren |
| 4,907,886 A | 3/1990 | Dandliker et al. |

(Continued)

OTHER PUBLICATIONS

D'Ariano et al. "Lower Bounds On Phase Sensitivity In Ideal And Feasible Measurements," Section IV. *Phys. Rev A 49* pp. 3022 (1994).

(Continued)

*Primary Examiner*—Patrick J Connolly
(74) *Attorney, Agent, or Firm*—Wilmer Cutler Pickering Hale & Dorr LLP

(57) ABSTRACT

An interferometery system for making interferometric measurements of an object, the system including: a beam generation module which during operation delivers an output beam that includes a first beam at a first frequency and a second beam at a second frequency that is different from the first frequency, the first and second beams within the output beam being coextensive, the beam generation module including a beam conditioner which during operation introduces a sequence of different shifts in a selected parameter of each of the first and second beams, the selected parameter selected from a group consisting of phase and frequency; a detector assembly having a detector element; and an interferometer constructed to receive the output beam at least a part of which represents a first measurement beam at the first frequency and a second measurement beam at the second frequency, the interferometer further constructed to image both the first and second measurement beams onto a selected spot on the object to produce therefrom corresponding first and second return measurement beams, and to then simultaneously image the first and second return measurement beams onto said detector element.

43 Claims, 5 Drawing Sheets

U.S. PATENT DOCUMENTS

| | | |
|---|---|---|
| 5,150,248 A | 9/1992 | Alfano et al. |
| 5,214,633 A | 5/1993 | Tanno et al. |
| 5,220,403 A | 6/1993 | Batchelder et al. |
| 5,241,423 A | 8/1993 | Chiu et al. |
| 5,327,223 A | 7/1994 | Korth |
| 5,485,317 A | 1/1996 | Perissinotto |
| 5,602,643 A | 2/1997 | Barrett |
| 5,614,763 A | 3/1997 | Womack |
| 5,633,972 A | 5/1997 | Walt |
| 5,659,420 A | 8/1997 | Wakai |
| 5,699,201 A | 12/1997 | Lee |
| 5,760,901 A | 6/1998 | Hill |
| 5,828,455 A | 10/1998 | Smith |
| 5,894,195 A | 4/1999 | McDermott |
| 5,915,048 A | 6/1999 | Hill et al. |
| 6,052,231 A | 4/2000 | Rosenbluth |
| 6,091,496 A | 7/2000 | Hill |
| 6,124,931 A | 9/2000 | Hill |
| 6,219,144 B1 | 4/2001 | Hill et al. |
| 6,271,923 B1 | 8/2001 | Hill |
| 6,330,065 B1 | 12/2001 | Hill |
| 6,407,816 B1 | 6/2002 | De Groot et al. |
| 6,445,453 B1 | 9/2002 | Hill |
| 6,447,122 B1 | 9/2002 | Kobayashi et al. |
| 6,480,285 B1 | 11/2002 | Hill |
| 6,552,805 B2 | 4/2003 | Hill |
| 6,552,852 B2 | 4/2003 | Hill |
| 6,597,721 B1 | 7/2003 | Hutchinson et al. |
| 6,606,159 B1 | 8/2003 | Hill |
| 6,667,809 B2 | 12/2003 | Hill |
| 6,714,349 B2 | 3/2004 | Nam |
| 6,717,736 B1 | 4/2004 | Hill |
| 6,724,486 B1 * | 4/2004 | Shull et al. ............... 356/486 |
| 6,748,015 B2 | 6/2004 | Kohli et al. |
| 6,753,968 B2 | 6/2004 | Hill |
| 6,775,009 B2 | 8/2004 | Hill |
| 6,847,029 B2 | 1/2005 | Hill |
| 6,847,452 B2 | 1/2005 | Hill |
| 7,099,014 B2 * | 8/2006 | Hill ............................ 356/450 |
| 2002/0001087 A1 | 1/2002 | Hill |
| 2002/0074493 A1 | 6/2002 | Hill et al. |
| 2003/0025913 A1 | 2/2003 | Izatt et al. |
| 2003/0053073 A1 | 3/2003 | Hill |
| 2003/0174992 A1 | 9/2003 | Levene et al. |
| 2004/0160023 A1 | 8/2004 | Liu |
| 2004/0201852 A1 | 10/2004 | Hill |
| 2004/0201853 A1 | 10/2004 | Hill |
| 2004/0201854 A1 * | 10/2004 | Hill ............................ 356/511 |
| 2004/0201855 A1 * | 10/2004 | Hill ............................ 356/511 |
| 2004/0202426 A1 | 10/2004 | Hill |
| 2004/0227950 A1 | 11/2004 | Hill |
| 2004/0227951 A1 * | 11/2004 | Hill ............................ 356/450 |
| 2004/0228008 A1 | 11/2004 | Hill |
| 2004/0246486 A1 | 12/2004 | Hill |
| 2004/0257577 A1 * | 12/2004 | Hill ............................ 356/450 |
| 2008/0180682 A1 * | 7/2008 | Hill ............................ 356/484 |

OTHER PUBLICATIONS

Harris et al. "Generation of Ultraviolet and Vacuum Ultraviolet Radiation," *Laser Spectroscopy I*, Plenum Press, NY (1974) p. 59-75.

Kung, A.H. "Generation of Tunable Picosecond VUV Radiation," *Appl. Phys. Lett.* 25, (1974) p. 653-654.

Silfvast, "Lasers," *Handbook of Optics*, 1999 (McGraw Hill, NY) (41 pages).

Stoicheff et al. "Tunable, Coherent Sources for High Resolution VUV and XUV Spectroscopy," *Laser Techniques for Extreme Ultraviolet Spectroscopy*, (1982) p. 19-31.

Zanoni, C. "Differential Interferometer Arrangements For Distance And Angle Measurements: Principles, Advantages and Applications" *VDI Berichte* NR. 749, pp. 93-106 (1989).

\* cited by examiner

APPARATUS AND METHOD FOR JOINT MEASUREMENTS OF CONJUGATED QUADRATURES OF FIELDS OF REFLECTED/SCATTERED AND TRANSMITTED BEAMS BY AN OBJECT IN INTERFEROMETRY

This application claims the benefit of U.S. Provisional Application No. 60/442,858, filed Jan. 27, 2003 (ZI-47); and U.S. Provisional Application No. 60/442,892, filed Jan. 28, 2003 (ZI-45) and U.S. application Ser. No. 10/765,368 filed on Jan. 27, 2004, all of which are incorporated herein by reference.

This application also incorporates by reference: U.S. Patent Application entitled "Interferometric Confocal Microscopy Incorporating A Pinhole Array Beam-Splitter," filed on Jan. 27, 2004 (ZI-45).

TECHNICAL FIELD

This invention relates to the measurement of conjugated quadratures of fields of reflected, scattered and transmitted beams by an object in interferometry.

BACKGROUND OF THE INVENTION

Over the years people have developed various sophisticated confocal interferometric techniques. Examples of the variety of the available technologies are the following.

There is interferometric, confocal far-field and near-field microscopy using heterodyne techniques and a detector having a single detector element or having a relatively small number of detector elements.

There is also interferometric confocal far-field and near-field microscopy using a step and stare method with a single-homodyne detection method for acquiring conjugated quadratures of fields of reflected and/or scattered beams when a detector is used that includes a large number of detector elements. The respective conjugated quadrature of a field is $|\alpha|\sin\phi$ when the quadrature $x(\phi)$ of a field is expressed as $|\alpha|\cos\phi$. The step and stare method and single-homodyne detection method have been used in order to obtain for each detector element a set of at least four electrical interference signal values with a substrate that is stationary with respect to the respective interferometric microscope during the stare portion of the step and stare method. The set of at least four electrical interference signal values are required to obtain for each detector element conjugated quadratures of fields of a measurement beam comprising a reflected and/or scattered far-field or near-field from a spot in or on a substrate that is conjugate to the each detector element.

There are heterodyne and single-homodyne detection methods to obtain phase information in linear and angular displacement interferometers.

And there is a double homodyne detection method based on use of four detectors wherein each detector generates an electrical interference signal value used to determine a corresponding component of a conjugated quadratures of a field such as described in Section IV of the article by G. M D'ariano and M G. A. Paris entitled "Lower Bounds On Phase Sensitivity In Ideal And Feasible Measurements," *Phys. Rev. A* 49, 3022-3036 (1994).). The four detectors generate the four electrical interference signal values simultaneously and each electrical interference signal value contains information relevant to one conjugated quadratures component.

High speed, high resolution imaging with high signal-to-noise ratios is required, for example, in inspection of masks and wafers in microlithography. Two techniques that have been used for obtaining high resolution imaging with high signal-to-noise ratios are interferometric far-field and near-field confocal microscopy of the types described above. However, the acquisition of high signal-to-noise ratios with the high resolution imaging generally limits data rates in part by the necessity to acquire conjugated quadratures of fields of a reflected and/or scattered beam for each spot in and/on a substrate being imaged. The determination of conjugated quadratures requires the measurement of at least four electrical interference signal values for the each spots in and/or on the substrate being imaged. Acquisition of the at least four interference signal values for the each spots places tight restrictions on how large a rate of scan can be employed in generation of a one-dimensional, a two-dimensional or three-dimensional image of the substrate having artifacts down to of the order of 100 nm in size or smaller.

SUMMARY OF THE INVENTION

The bi-homodyne and quad-homodyne detection methods described herein relax the tight restrictions and permit significantly increased throughput in high resolution imaging that has high signal-to-noise ratios for each spot being imaged. The tight restrictions are relaxed as a consequence of a joint measurement of conjugated quadratures of fields using a conjugate set of four pixels for each spot being imaged wherein the temporal window function for the measured four electrical interference signal values used in the determination of one component of conjugated quadratures of fields is the same as the temporal window function for the measured four interference signal values used in the determination of the second component of the conjugated quadratures of the fields, i.e., the two sets of four interference signal values are the same.

With the bi-homodyne detection method, the two temporal window functions are made the same by using one frequency component of an input beam for the determination of one component of the conjugated quadratures of the fields and using a second frequency component of the input beam for the determination of the second component of the conjugated quadratures of the fields. The two frequency components of the input beam are coextensive in spatial and temporal coordinates, i.e., coextensive in space and have the same temporal window functions in the interferometer system.

With the quad-homodyne detection method, the two temporal window functions are made the same by using two frequency components of an input beam for the determination of one component of the conjugated quadratures of the fields and using two other frequency components of the input beam for the determination of the second component of the conjugated quadratures of the fields. The four frequency components of the input beam are coextensive in spatial and temporal coordinates, i.e., coextensive in space and have the same temporal window functions in the interferometer system.

At least some of the bi-homodyne and quad-homodyne detection methods described herein obtain four electrical interference signal values wherein each measured value of an electrical interference signal contains simultaneously information about two orthogonal components of a conjugated quadratures.

The bi-homodyne detection method uses a single detector element for each electrical interference signal value obtained and an input beam to an interferometer system comprising two frequency components with a frequency difference large compared to the frequency bandwidth of the detector for a joint measurement of the conjugated quadratures. One frequency component is used to generate an electrical interference signal component corresponding to a first component of conjugated quadratures of a field of a corresponding measurement beam comprising either a reflected and/or scattered or transmitted far-field or near-field from a spot in or on a measurement object that is conjugate to the detector element. The second frequency component is used to generate a second electrical interference signal component corresponding to a respective second component of the conjugated quadratures of the field. Information about the first and second components of the conjugated quadratures are obtained jointly as a consequence of the two frequency components being coextensive in space and having the same temporal window function in the interferometer system. The temporal window function when operating in a scanning mode corresponds to the window function of a respective set of pulses of the input beam to the interferometer system.

When operating in the scanning mode and using either the bi-homodyne or quad-homodyne detection methods described herein, conjugate sets of detector elements are defined and used. A conjugate set of detector elements comprises the pixels of the detector conjugate to the spot on or in the substrate at the times that the measurements are made of a corresponding set of the four electrical interference signal values.

For each of the two frequency components of the input beam used in the bi-homodyne detection method, reference and measurement beams are generated. In certain of the embodiments that use the bi-homodyne detection method, different phase shift combinations are introduced between the respective reference and measurement beam components by shifting the frequencies of one or both of the two frequency components for acquiring a set of four electrical interference signal values for each spot in or on the measurement object that is imaged. In certain other of the embodiments that use the bi-homodyne detection method, different phase shift combinations are introduced between the respective reference and measurement beam components by a phase-shifter for each of the two frequency components for acquiring a set of the four electrical interference signal values for each spot in and/or on a measurement object or substrate that is imaged. In the certain of the embodiments, the difference in optical path of the reference and measurement beams is a non-zero value.

The quad-homodyne detection method uses two detectors and an input beam to an interferometer system comprising four coextensive measurement beams and corresponding reference beams in the interferometer system simultaneously to obtain four electrical signal values wherein each measured value of an electrical interference signal contains simultaneously information about two orthogonal components of a conjugated quadratures for a joint measurement of conjugated quadratures of a field of a beam either reflected and/or scattered or transmitted by a spot on or in a substrate. One detector element is used to obtain two electrical interference signal values and the second detector element is used to obtain two other of the four electrical interference signal values. The four coextensive measurement beams and corresponding reference beams are generated in the interferometer system simultaneously by using an input beam that comprises four frequency components wherein each frequency component corresponds to a measurement and corresponding reference beam. The frequency differences of the four frequency components are such that the four frequency components are resolved by an analyzer into two beams incident on the two different detector elements wherein each of the two beams comprises two different frequency components and the frequency differences are large compared to the frequency bandwidth of the detector. One of the two frequency components incident on a first detector element is used to generate an electrical interference signal component corresponding to a first component of conjugated quadratures of a field of a corresponding measurement beam comprising either a reflected and/or scattered or transmitted far-field or near-field from a spot in or on a measurement object that is conjugate to a detector element. The second of the two frequency components incident on the first detector element is used to generate a second electrical interference signal component corresponding to a respective second component of the conjugated quadratures of the field. The description for the second detector element with respect to frequency components and components of conjugated quadratures is the same as the corresponding description with respect to the first detector element. Information about the first and second components of the conjugated quadratures are accordingly obtained jointly as a consequence of the four frequency components being coextensive in space and having the same temporal window function in the interferometer system. The temporal window function when operating in a scanning mode corresponds to the window function of a respective set of two pulses or pulse sequences of the input beam to the interferometer system.

In general, according to one aspect of the invention, in interferometric far-field and near-field confocal and non-confocal microscopy respective at least four electrical interference signal values are acquired when operating in a relatively fast scanning mode wherein each of the at least four electrical interference signal values correspond to the same respective spot on or in a substrate and contain information that can be used for determination of joint measurements of conjugated quadratures of fields in both spatial and temporal coordinates.

In general, according to another aspect of the invention, joint measurements are made of conjugated quadratures of fields of beams reflected from a measurement object in single or multiple-wavelength linear and angular displacement interferometers.

In general, according to still another aspect of the invention, scanning interferometric far-field and near-field confocal and non-confocal microscopy, employing either a bi-homodyne or a quad-homodyne detection method, is used to obtain joint measurements of conjugated quadratures of fields either reflected and/or scattered or transmitted by a substrate with a detector having a large number of detector elements. For each spot in and/or on the substrate that is imaged, a corresponding set of four electrical interference signal values is obtained. Each of the set of four electrical interference signal values contains information for determination of a joint measurement of respective conjugated quadratures of fields.

In general, according to yet another aspect of the invention, in linear and angular displacement interferometry, joint measurements are made of conjugated quadratures of fields of beams reflected from a measurement object.

In general, in one aspect, the invention features an interferometry system for making interferometric measurements of an object. The system includes a beam generation module which during operation delivers an output beam that includes a first beam at a first frequency and a second beam at a second frequency that is different from said first frequency, wherein the first and second beams within the output beam being coextensive, and the beam generation module included a beam conditioner which during operation introduces a sequence of different shifts in a selected parameter of each of the first and second beams, the selected parameter selected from a group consisting of phase and frequency. The system also includes a detector assembly having a detector element, and an interferometer constructed to receive the output beam at least a part of which represents a first measurement beam at the first frequency and a second measurement beam at the second frequency, said interferometer further constructed to image both the first and second measurement beams onto a selected spot on the object to produce therefrom corresponding first and second return measurement beams, and to then simultaneously image the first and second return measurement beams onto said detector element.

Other embodiments include one or more of the following features. The beam generation module further includes a beam source which during operation generates a single input beam at a predetermined frequency, and the beam conditioner includes an optical element that derives the first and second beams from the single input beam. The optical element is an acousto-optic modulator. Each of the first and second beams includes a first component and a second component that is orthogonal to the first component, and the beam conditioner is constructed to introduce a first sequence of different discrete phase shifts into a relative phase difference between the first and second components of the first beam and concurrently therewith a second sequence of different discrete phase shifts into the relative phase difference between the first and second components of the second beam.

In some embodiments, the beam conditioner includes a first phase shifter for introducing the first sequence of different discrete phase shifts into the relative phase difference between the first and second components of the first beam and a second phase shifter for introducing the second sequence of different discrete phase shifts into the relative phase difference between the first and second components of the second beam. In at least some of those cases, the interferometer is characterized by a measurement beam optical path length and a reference beam optical path length and wherein the difference between those two optical path lengths is nominally zero. Also, the interferometer is constructed to generate the first measurement beam from the first component of the first beam and the second measurement beam from the first component of the second beam. And the interferometer is further constructed to generate a first reference beam from the second component of the first beam and a second reference beam from the second component of the second beam. The first phase shifter introduces the first sequence of different discrete phase shifts into the second component of the first beam and the second phase shifter introduces the second sequence of different discrete phase shifts into the second component of the second beam.

In other embodiments, the beam conditioner is constructed to introduce a first sequence of different frequency shifts into the frequency of the first beam and concurrently therewith a second sequence of different frequency shifts into the frequency of the second beam. The beam conditioner includes a first set of acousto-optic modulators for introducing the first sequence of different frequency shifts into the frequency of the first beam and a second set of acousto-optic modulators for introducing the second sequence of different frequency shifts into the frequency of the second beam. In at least some of those cases, the interferometer is characterized by a measurement beam optical path length and a reference beam optical path length and wherein the difference between those two optical path lengths is nominally a non-zero value.

In addition, in other embodiments, the interferometer system further includes a controller which controls the beam conditioner and causes the beam conditioner to introduce the first and second sequences of different shifts in the selected parameter of each of the first and second beams. The controller is programmed to acquire from the detector assembly measured values for a set of interference signals resulting from introducing the first and second sequences of different shifts in the selected parameters of each of the first and second beams and further programmed to compute first and second components of conjugated quadratures of the fields of beams from said selected spot. The detector element is characterized by a frequency bandwidth and the first and second frequencies are separated by an amount that is larger than the frequency bandwidth of the detector.

The interferometer can be any one of a wide variety of types of interferometer, including without limitation, a scanning interferometric far-field confocal microscope, a scanning interferometric far-field non-confocal microscope, a scanning interferometric near-field confocal microscope, a scanning interferometric near-field non-confocal microscope, and a linear displacement interferometer.

In general, in another aspect, the invention features an interferometry system for making interferometric measurements of an object. The system includes a beam generation module which during operation delivers an output beam that includes a first beam at a first frequency and a second beam at a second frequency that is different from the first frequency, and the first and second beams within the output beam being coextensive. The interferometry system also includes a detector assembly having a detector element that is characterized by a frequency bandwidth, wherein the first and second frequencies are separated by an amount that is larger than the frequency bandwidth of the detector; and an interferometer constructed to receive the output beam, at least a part of which represents within the interferometer a first measurement beam at the first frequency and a second measurement beam at the second frequency. The interferometer is further constructed to simultaneously image both the first and second measurement beams onto a selected spot on or in the object to produce therefrom corresponding first and second return measurement beams, and then to simultaneously image the first and second return measurement beams onto the detector element.

In general, in still another aspect, the invention features a source beam assembly including a beam generation module which during operation delivers an output beam that includes a first beam at a first frequency and a second beam at a second frequency that is different from the first frequency, and wherein the first and second beams within the output beam are coextensive. The beam generation module included a beam conditioner which during operation introduces a sequence of different shifts in a selected parameter of each of the first and second beams, wherein the selected parameter selected from a group consisting of phase and frequency.

In general, in still yet another aspect, the invention features a method of performing measurements of an object using an interferometer. The method includes generating an input beam for the interferometer, wherein the input beam includes a first beam at a first frequency and a second beam at a second frequency that is different from the first frequency, and wherein the first and second beams are coextensive and share the same temporal window. The method further includes, using the interferometer and the input beam supplied to the interferometer, to jointly measure two orthogonal components of conjugated quadratures of fields of reflected, scattered, or transmitted beams from a selected spot in and/or on the object.

In general, another aspect, the invention features a method of performing measurements of an object using an interferometer wherein the method includes generating a source beam for the interferometer, therein the source beam included a first input beam at a first frequency and a second input beam at a second frequency that is different from the first frequency, and using the source beam supplied to the interferometer, to make a sequence of measurements of an interference signal for a selected spot on or in the object. The first and second input beams are coextensive and share the same temporal window function. The making of the sequence of measurements involves, for each measurement of the sequence of measurements, introducing a corresponding different shift in a selected parameter of the first input beam and a corresponding different shift in the selected parameter of the second input beam, wherein selected parameter is selected from the group consisting of phase and frequency. Each measurement of the sequence of measurements simultaneously captures information for both conjugated quadratures of fields of reflected, scattered, or transmitted beams from the selected spot.

In general, in still yet another aspect, the invention features a method of generating an source beam, that includes generating an output beam that includes a first beam at a first frequency and a second beam at a second frequency that is different from the first frequency, wherein the first and second beams within the output beam being coextensive; and introducing a sequence of different shifts in a selected parameter of each of the first and second beams, wherein the selected parameter is selected from a group consisting of phase and frequency.

In general, in another aspect, the invention features a method of performing measurements of an object using a scanning confocal interferometer in which there is an array of pinholes. The method includes generating an input beam for the scanning interferometer, wherein the input beam included a first beam at a first frequency and a second beam at a second frequency that is different from the first frequency, and wherein the first and second beams are coextensive and share the same temporal window function. The method also includes causing an image of the array of pinholes to scan across the object so that each pinhole of a conjugate set of pinholes among the array of pinholes becomes conjugate to a selected spot on or in the object at successive times during the scan; for each pinhole of the conjugate set of pinholes, measuring an interference signal value for a selected spot on or in the object, wherein the measured interference signal value for each pinhole of the conjugate set of pinholes simultaneously captures information for two orthogonal components of conjugated quadratures of fields of reflected, scattered, or transmitted beams from the selected spot.

In general, in yet another aspect, the invention features a method of performing measurements of an object using a scanning confocal interferometer in which there is an array of pinholes. In this case, the method includes generating an input beam for the scanning interferometer, wherein the input beam included a first beam at a first frequency and a second beam at a second frequency that is different from the first frequency, and wherein the first and second beams are coextensive and share the same temporal window function. The method also includes causing an image of the array of pinholes to scan across the object so that each detector element of a conjugate set of detector elements among an array of detector elements becomes conjugate to a selected spot on or in the object at successive times during the scan; for each detector of the conjugate set of detectors, measuring an interference signal value for a selected spot on or in the object, wherein the measured interference signal value for each detector of the conjugate set of detectors simultaneously captures information for two orthogonal components of conjugated quadratures of fields of reflected, scattered, or transmitted beams from the selected spot.

An advantage of at least one embodiment of the present invention is that a one-dimensional, two-dimensional or three-dimensional image of a substrate may be obtained in interferometric confocal or non-confocal far-field and near-field microscopy when operating in a scanning mode with a relatively fast scan rate. The image comprises a one-dimensional array, a two-dimensional array or a three-dimensional array of conjugated quadratures of reflected and/or scattered or transmitted fields.

Another advantage of at least one embodiment of the present invention is that information used in the determination of a conjugated quadratures of reflected and/or scattered or transmitted fields by a substrate is obtained jointly, i.e., simultaneously.

Another advantage of at least one embodiment of the present invention is that the conjugated quadratures of fields that are obtained jointly when operating in the scanning mode and using either the bi-homodyne or quad-homodyne detection methods have reduced sensitivity to effects of pinhole-to-pinhole variations in the properties of a conjugate set of pinholes used in a confocal microscopy system that are conjugate to a spot in or on the substrate being imaged at different times during the scan.

Another advantage of at least one embodiment of the present invention is that the conjugated quadratures of fields that are obtained jointly when operating in the scanning mode and using either the bi-homodyne or the quad-homodyne detection methods have reduced sensitivity to effects of pixel-to-pixel variation of properties within a set of conjugate pixels that are conjugate to a spot in or on the substrate being imaged at different times during the scan.

Another advantage of at least one embodiment of the present invention is that the conjugated quadratures of fields that are obtained jointly when operating in the scanning mode and using either the bi-homodyne or the quad-homodyne detection methods have reduced sensitivity to effects of pulse to pulse variations of a respective set of pulses or pulse sequences of the input beam to the interferometer system.

Another advantage of at least one embodiment of the present invention is an increased throughput for an interferometric far-field or near-field confocal or non-confocal microscope with respect to the number of spots in and/or on a substrate imaged per unit time.

Another advantage of at least one embodiment of the present invention is reduced systematic errors in a one-dimensional, a two-dimensional or a three-dimensional image of a substrate obtained in interferometric far-field and near-field confocal and non-confocal microscopy.

Another advantage of at least one embodiment of the present invention is reduced sensitivity to vibrations in generating one-dimensional, two-dimensional or three-dimensional images of a substrate by interferometric far-field and near-field confocal and non-confocal microscopy.

Another advantage of at least one embodiment of the present invention is reduced sensitivity to an overlay error of a spot in or on the substrate that is being imaged and a conjugate image of a conjugate pixel of a multi-pixel detector during the acquisition of the four electrical interference values for each spot in and/or on a substrate imaged using interferometric far-field and/or near-field confocal and non-confocal microscopy. Overlay errors are errors in the set of four conjugate images of a respective set of conjugate detector pixels relative to the spot being imaged for either the bi-homodyne quad-homodyne detection methods.

Another advantage of at least one embodiment of the present invention is that the phase of an input beam component does not affect values of measured conjugated quadratures when operating in frequency-shift mode of either the bi-homodyne or quad-homodyne detection methods.

DETAILED DESCRIPTION

Figure 1A:
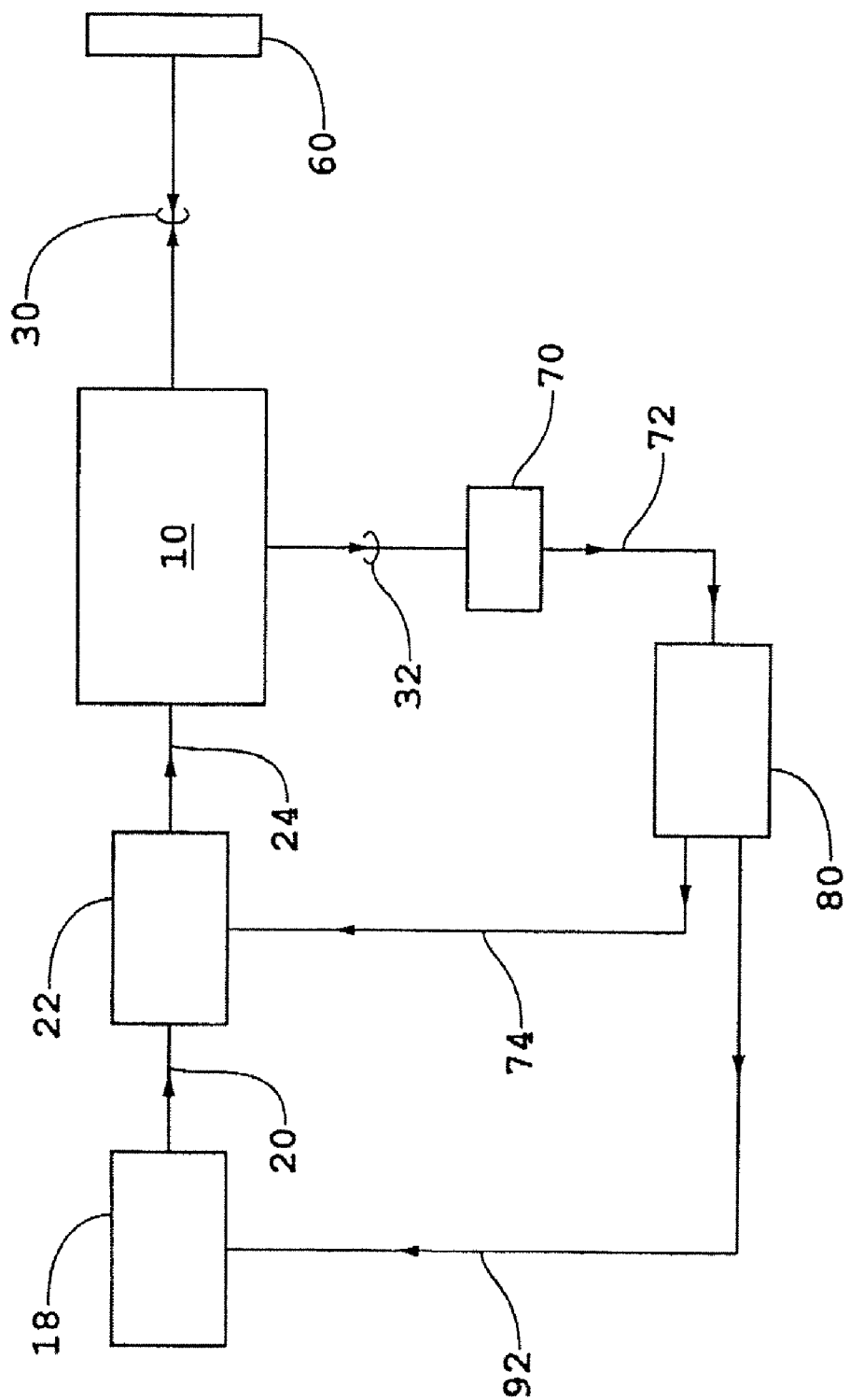
FIG. 1a is a diagram of an interferometric system that uses the bi-homodyne and quad-homodyne detection methods.

Apparatus and methods are described herein for joint measurements of conjugated quadratures of fields of reflected and/or scattered and/or transmitted beams in interferometry such as scanning interferometric far-field and near-field confocal and non-confocal microscopy and in interferometric based metrology such as linear displacement interferometers. A bi-homodyne detection method and a quad-homodyne detection method are used to obtain measurements of quantities subsequently used in determination of joint measurements of the conjugated quadratures of fields. The prefixes bi- and quad- refer to the number of different coextensive measurement and corresponding reference beams present in an interferometer system simultaneously, i.e., 2 and 4, respectively.

With respect to information content and signal-to-noise ratios, the conjugated quadratures of fields obtained jointly in a microscopy system that is operating in a scanning mode and using either the bi-homodyne or quad-homodyne detection methods are substantially equivalent to conjugated quadratures of fields obtained when operating the microscopy system in a step and stare mode, i.e., a non-scanning mode. The conjugated quadratures of fields obtained jointly when operating in the scanning mode and using either the bi-homodyne or the quad-homodyne detection methods have reduced sensitivity to pinhole-to-pinhole variations in properties of a conjugate set of pinholes used in a confocal microscopy system and reduced sensitivity to pixel-to-pixel variation of properties within a set of conjugate pixels of a multipixel detector in confocal and non-confocal microscopy systems.

The conjugated quadratures of fields obtained jointly when operating in the scanning mode and using either the bi-homodyne or the quad-homodyne detection method have reduced sensitivity to pulse to pulse variations of the input beam used in generating the conjugated quadratures of fields, reduced sensitivity to vibrations of a substrate, and reduced sensitivity to a relative motion of a substrate being imaged during the acquisition of joint measurements of the conjugated quadratures of fields. The reduced sensitivity is relative to conjugated quadratures of fields obtained when operating in a single-homodyne detection mode and for operating in either a scanning or non-scanning mode. In microscopy applications, conjugated quadratures of fields are obtained for each spot in and/or on a substrate that is imaged.

The conjugated quadratures of fields that are obtained jointly in a single or multiple wavelength linear displacement interferometer operating in a scanning mode and using either the bi-homodyne or the quad-homodyne detection methods have a reduced phase redundancy problem and have reduced sensitivity to vibrations as compared to a single or multiple wavelength linear or angular displacement interferometer operating in a scanning mode and using a single-homodyne detection method.

Several embodiments are described that comprise interferometric confocal and non-confocal far-field and near-field microscopy systems and a linear displacement interferometer, e.g., such as used in wavelength monitors, refractivity of gas monitors, monitors of the reciprocal dispersive power $\Gamma$ of a gas, and dispersion interferometry. In the first embodiment, the difference in the optical path length of a reference beam and a measurement beam in a interferometric far-field confocal microscope is a relatively large non-zero value, e.g., 0.2 m, and in the second embodiment, the difference in the optical path length of the reference beam and the measurement beam in a interferometric confocal far-field microscope is nominally zero. The difference in the optical path length of the reference and measurement beams in interferometric measurements is normally kept a minimum value. However, in certain interferometric far-field confocal microscopes the difference in the optical path length of the reference and measurement beams is a relatively large value such as described in U.S. Provisional Patent Application No. 60/442, 982 [ZI-45] entitled "Interferometric Confocal Microscopy Incorporating Pinhole Array Beam-Splitter" by Henry A. Hill, the contents of which are herein incorporated in their entirety by reference.

A general description of embodiments incorporating various aspects of the present invention will first be given wherein the bi-homodyne and the quad-homodyne detection methods are used in interferometer systems for measuring conjugated quadratures of fields of beams reflected and/or scattered and of beams transmitted by a substrate. Referring to FIG. 1a, an interferometer system is shown diagrammatically comprising an interferometer generally shown as numeral 10 for measuring beams reflected and/or scattered and beams transmitted by a measurement object 60, a source 18, a beam-conditioner 22, detector 70, and an electronic processor and controller 80. Source 18 is a pulsed source that generates input beam 20 comprising either one, two, or four frequency components. Beam 20 is incident on and exits beam-conditioner 22 as input beam 24 that has either two or four frequency components. The measurement beam components of the two or four frequency components of input beam 24 are coextensive in space and have the same temporal window function and the corresponding reference beam components are coextensive in space and have the same temporal window function.

Reference and measurement beams may be generated in either beam-conditioner 22 from a set of beams or in interferometer 10 for each of the two or four frequency components of input beam 24. Measurement beam 30A generated in either beam-conditioner 22 or in interferometer 10 is incident on substrate 60. Measurement beam 30B is a return measurement beam generated as either a portion of measurement beam 30A reflected and/or scattered by substrate 60 or a portion of measurement beam 30A transmitted by substrate 60. Return measurement beam 30B is combined with the reference beam in interferometer 10 to form output beam 32.

Output beam 32 is detected by detector 70 to generate either one or two electrical interference signals per source pulse or pulse sequence for the bi-homodyne or quad-homodyne detection methods, respectively, and transmitted as signal 72. Detector 70 may comprise an analyzer to select common polarization states of the reference and return measurement beam components of beam 32 to form a mixed beam. Alternatively, interferometer 10 may comprise an analyzer to select common polarization states of the reference and return measurement beam components such that beam 32 is a mixed beam.

In practice, known phase shifts are introduced between the reference and measurement beam components of output beam 32 by two different techniques. In one technique, phase shifts are introduced between the reference and measurement beam components for each of the two or four frequency components of input beam 24 by beam-conditioner 22 as controlled by signal 74 from electronic processor and controller 80. In the second technique, phase shifts are introduced between corresponding reference and measurement beam components for each of the two or four frequency components of output beam 32 as a consequence of a non-zero optical path difference between the reference and measurement beam paths in interferometer 10 and corresponding frequency shifts introduced to the two or four frequency components of input beam 24 by beam-conditioner 22 and/or source 18 as controlled by signal 74 from electronic processor and controller 80.

Figure 1B:
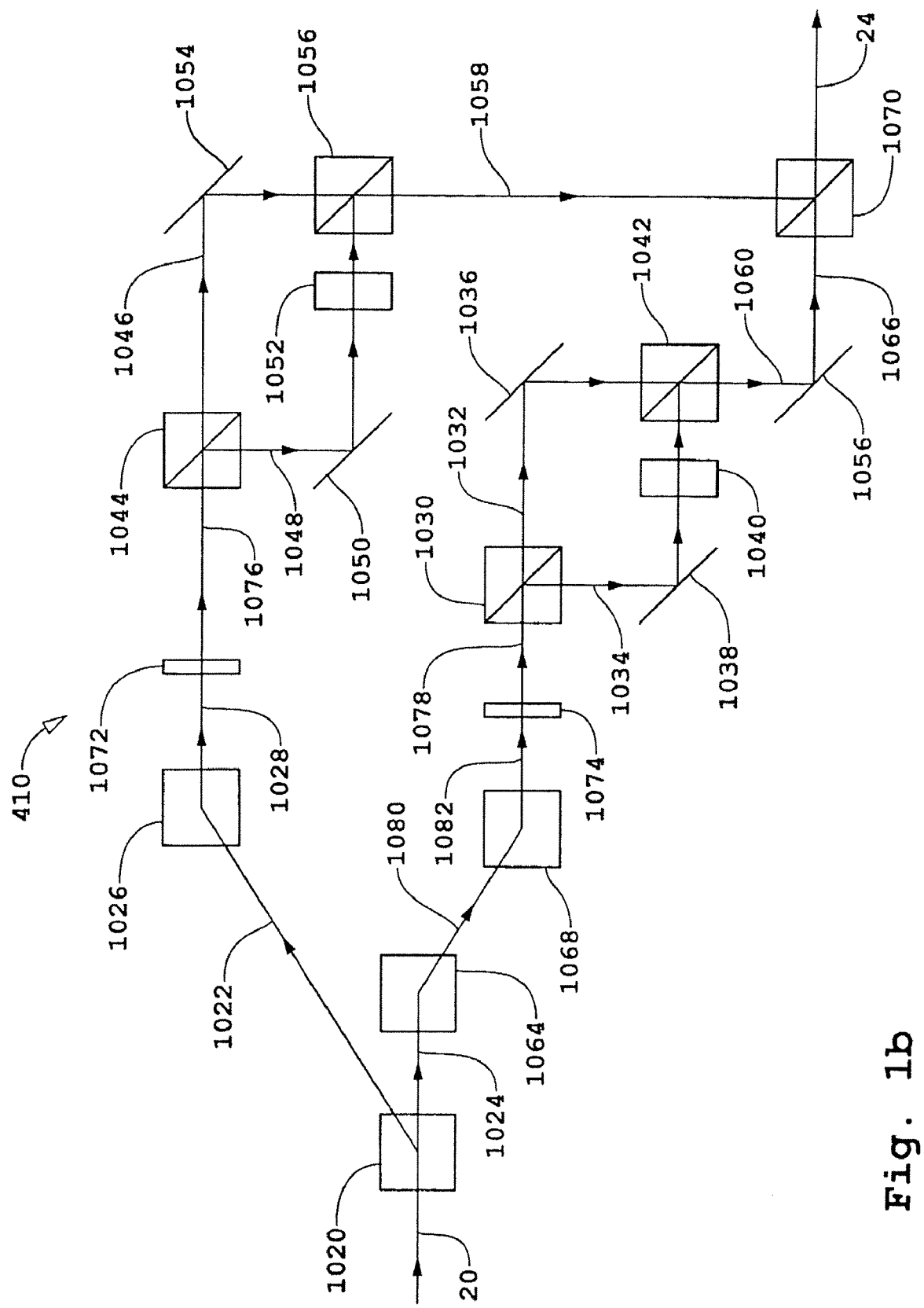
FIG. 1b is a schematic diagram of a beam-conditioner configured to operate in a two-frequency generator and phase shifter.

There are different ways to configure source 18 and beam-conditioner 22 to meet the input beam requirements of different embodiments described herein. Reference is made to FIG. 1b where beam-conditioner 22 is configured as a two-frequency generator and a phase-shifter and source 18 is configured to generate beam 20 with one frequency component. The two-frequency generator and phase-shifter configuration comprises acousto-optic modulators 1020, 1026, 1064 and 1068; polarizing beam-splitters 1030, 1042, 1044, and 1056; phase-shifters 1040 and 1052; half wave phase retardation plates 1072 and 1074; non-polarizing beam-splitter 1070; and mirrors 1036, 1038, 1050, and 1054.

Input beam 20 is incident on acousto-optic modulator 1020 with a plane of polarization parallel to the plane of FIG. 1b. A first portion of beam 20 is diffracted by acousto-optic modulator 1020 as beam 1022 and then by acousto-optic modulator 1026 as beam 1028 having a polarization parallel to the plane of FIG. 1b. A second portion of beam 20 is transmitted as a non-diffracted beam 1024 having a plane of polarization parallel to the plane of FIG. 1b. The acoustic power to acousto-optic modulator 1020 is adjusted such that beams 1022 and 1024 have nominally the same intensity.

Acousto-optic modulators 1020 and 1026 may be of either the non-isotropic Bragg diffraction type or of the isotropic Bragg diffraction type. The frequency shifts introduced by acousto-optic modulators 1020 and 1026 are of the same sign and equal to ¼ of the desired frequency shift between the two frequency components of input beam 24. Also the direction of propagation of beam 1028 is parallel to the direction of propagation of beam 1024.

Beam 1024 is diffracted by acousto-optic modulators 1064 and 1068 as beam 1082 having a polarization parallel to the plane of FIG. 1b. Acousto-optic modulators 1064 and 1068 may be of either the non-isotropic Bragg diffraction type or of the isotropic Bragg diffraction type. The frequency shifts introduced by acousto-optic modulators 10640 and 1068 are of the same sign and equal to ¼ of the desired frequency shift between the two frequency components of input beam 24. Also the direction of propagation of beam 1082 is parallel to the direction of propagation of beam 1024.

Beams 1028 and 1082 are incident on half-wave phase retardation plates 1072 and 1074, respectively, and transmitted as beams 1076 and 1078, respectively. Half-wave phase retardation plates 1072 and 1074 are oriented such that the planes of polarization of beams 1076 and 1078 are at 45 degrees to the plane of FIG. 1b. The components of beams 1076 and 1078 polarized parallel to the plane of FIG. 1b will be used as the measurement beam components in interferometer 10 and the components of beams 1076 and 1078 polarized orthogonal to the plane of FIG. 1b will be used as the reference beam components in interferometer 10.

Continuing with reference to FIG. 1b, beam 1076 is incident on polarizing beam-splitter 1044 and the respective measurement and reference beam components transmitted and reflected, respectively, as beams 1046 and 1048, respectively. Measurement beam component 1046 is transmitted by polarizing beam-splitter 1056 as a measurement beam component of beam 1058 after reflection by mirror 1054. Reference beam component 1048 is reflected by polarizing beam-splitter 1056 as reference beam component of beam 1058 after reflection by mirror 1050 and transmission by phase-shifter 1052. Beam 1058 is incident on beam-splitter 1070 and a portion thereof is reflected as a component of beam 24.

Beam 1078 is incident on polarizing beam-splitter 1030 and the respective measurement and reference beam components transmitted and reflected, respectively, as beams 1032 and 1034, respectively. Measurement beam component 1032 is transmitted by polarizing beam-splitter 1042 as a measurement beam component of beam 1060 after reflection by mirror 1036. Reference beam component 1034 is reflected by polarizing beam splitter 1042 as reference beam component of beam 1060 after reflection by mirror 1038 and transmission by phase-shifter 1040. Beam 1060 is incident on beam-splitter 1070 and a portion thereof is transmitted as a component of beam 24 after reflection by mirror 1056.

Phase-shifters 1052 and 1040 introduce phase shifts between respective reference and measurement beams according to signal 74 from electronic processor and controller 80 (see FIG. 1a). The schedule of the respective phase shifts is described in the subsequent discussion of Equation (1). Phase-shifters 1052 and 1040 may be for example of the optical-mechanical type comprising for example prisms or mirrors and piezoelectric translators or of the electro-optical modulator type.

Beam 24 that exits beam-conditioner 22 comprises one reference beam and measurement beam having one frequency, a second reference beam and measurement beam having a second frequency, and relative phases of the reference beams and the measurement beams that are controlled by electronic processor and controller 80 through control signal 74.

Figure 1C:
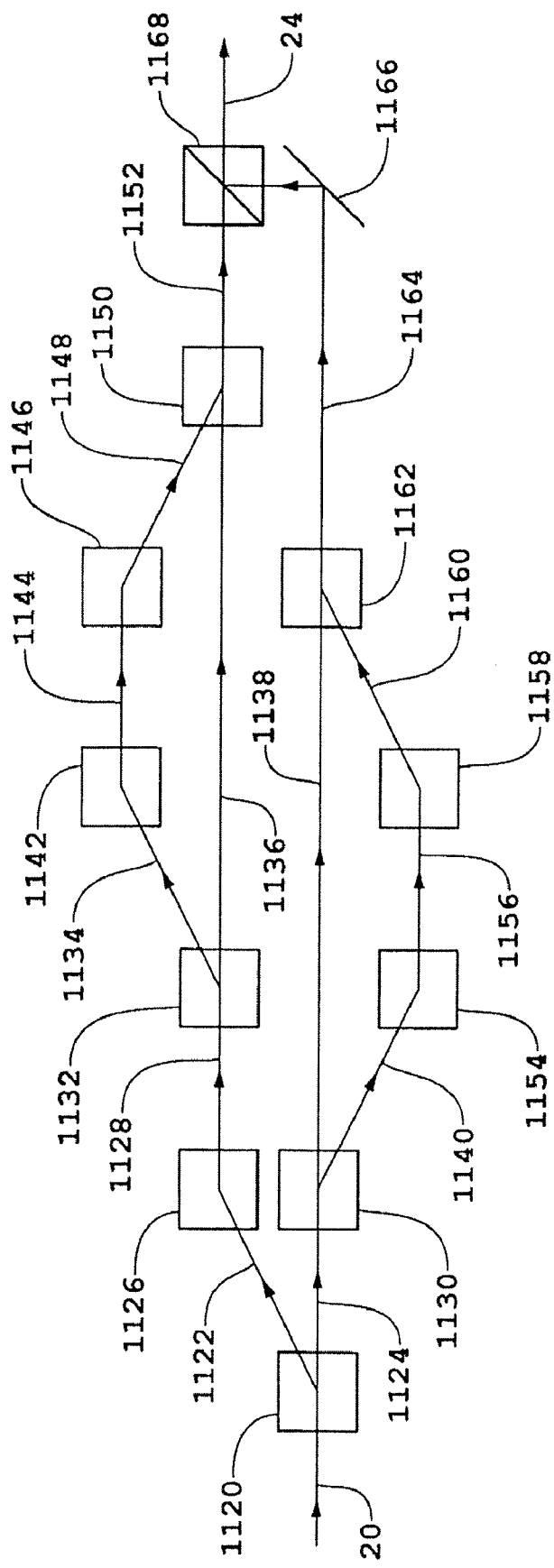
FIG. 1c is a schematic diagram of a beam-conditioner configured to operate in a two-frequency generator and frequency-shifter.

Continuing with a description of different ways to configure source 18 and beam-conditioner 22 to meet the input beam requirements of different embodiments described herein, reference is made to FIG. 1c where beam-conditioner 22 is configured as a two-frequency generator and a frequency shifter. The two-frequency generator and frequency-shifter configuration comprises acousto-optic modulators 1120, 1126, 1130, 1132, 1142, 1146, 1150, 1154, 1058, and 1062; beam-splitter 1168; and mirror 1166.

Source 18 is configured to generate beam 20 with a single frequency component. Beam 20 is incident on acousto-optic modulator 1120 with a plane of polarization parallel to the plane of FIG. 1c. A first portion of beam 20 is diffracted by acousto-optic modulator 1120 as beam 1122 and then by acousto-optic modulator 1126 as beam 1128 having a polarization parallel to the plane of FIG. 1c. A second portion of beam 20 is transmitted as a non-diffracted beam 1124 having a plane of polarization parallel to the plane of FIG. 1e. The acoustic power to acousto-optic modulator 1120 is adjusted such that beams 1122 and 1124 have nominally the same intensity.

Acousto-optic modulators 1120 and 1126 may be of either the non-isotropic Bragg diffraction type or of the isotropic Bragg diffraction type. The frequency shifts introduced by acousto-optic modulators 1120 and 1126 are of the same sign and equal to ½ of a frequency shift $\Delta f$ that will generate in interferometer 10 a relative $\pi/2$ phase shift between a corresponding reference beam and a measurement beam that have a relative change in frequency equal to the frequency shift $\Delta f$. The direction of propagation of beam 1128 is parallel to the direction of propagation of beam 1124.

Continuing with FIG. 1c, beam 1128 is incident on acousto-optic modulator 1132 and is either diffracted by acousto-optic modulator 1132 as beam 1134 or transmitted by acousto-optic modulator 1132 as beam 1136 according to control signal 74 (see FIG. 1a) from electronic processor and controller 80. When beam 1134 is generated, beam 1134 is diffracted by acousto-optic modulators 1142, 1146, and 1150 as a frequency-shifted beam component of beam 1152. The frequency shifts introduced by acousto-optic modulators 1132, 1142, 1146, and 1150 are all in the same direction and equal in magnitude to $\Delta f/2$. Thus the net frequency shift introduced by acousto-optic modulators 1132, 1142, 1146, and 1150 is $\pm 2\Delta f$ and will generate a relative $\pi$ phase between the respective reference and measurement beams in interferometer 10. The net frequency shift introduced by acousto-optic modulators 1120, 1126, 1132, 1142, 1146, and 1150 is $\Delta f \pm 2\Delta f$ and will generate a respective relative phase shift of $\pi/2 \pm \pi$, between the respective reference and measurement beams in interferometer 10.

When beam 1136 is generated, beam 1136 is transmitted by acousto-optic modulator 1150 according to control signal 74 from electronic processor and controller 80 as a non-frequency shifted beam component of beam 1152 with respect to beam 1128. The net frequency shift introduced by acousto-optic modulators 1120, 1126, 1132, and 1150 is $\Delta f$ which will generate a respective relative phase shift of $\pi/2$ between the respective reference and measurement beams in interferometer 10.

Beam 1124 is incident on acousto-optic modulator 1130 and is either diffracted by acousto-optic modulator 1130 as beam 1140 or transmitted by acousto-optic modulator 1130 as beam 1138 according to control signal 74 from electronic processor and controller 80. When beam 1140 is generated, beam 1140 is diffracted by acousto-optic modulators 1154, 1158, and 1162 as a frequency-shifted beam component of beam 1164. The frequency shifts introduced by acousto-optic modulators 1130, 1154, 1158, and 1162 are all in the same direction and equal to $\pm \Delta f/2$. Thus the net frequency shift introduced by acousto-optic modulators 1130, 1154, 1158, and 1162 is $\pm 2\Delta f$ and will generate a relative phase shift of $\pi$ between the respective reference and measurement beams on transit through interferometer 10. The net frequency shift introduced by acousto-optic modulators 1120, 1130, 1154, 1158, and 1162 is $\pm 2\Delta f$ and will generate a respective relative phase shift of $\pm \pi$ between the respective reference and measurement beams on transit through interferometer 10

When beam 1138 is generated, beam 1138 is transmitted by acousto-optic modulator 1162 according to control signal 74 from electronic processor and controller 80 as a non-frequency shifted beam component of beam 1164. The frequency shift introduced by acousto-optic modulators 1120, 1130, and 1162 is 0 and will generate a respective relative phase shift of 0 between the respective reference and measurement beams on transit through interferometer 10.

Beams 1152 and 1164 may be used directly as input beam 24 when an embodiment requires spatially separated reference and measurement beams for an input beam. When an embodiment requires coextensive reference and measurement beams as an input beam, beam 1152 and 1164 are combined by beam-splitter 1168 to form beam 24. Acousto-optic modulators 1120, 1126, 1130, 1132, 1142, 1146, 1150, 1154, 1058, and 1062 may be either of the non-isotropic Bragg diffraction type or of the isotropic Bragg diffraction type. Beams 1152 and 1164 are both polarized in the plane of FIG. 1c for either non-isotropic Bragg diffraction type or of the isotropic Bragg diffraction type and beam-splitter 1168 is of the non-polarizing type.

With a continuation of the description of different ways to configure source 18 and beam-conditioner 22 to meet the input beam requirements of different embodiments, source 18 will preferably comprise a pulse source. There are a number of different ways for producing a pulsed source [see Chapter 11 entitled "Lasers", *Handbook of Optics,* 1, 1995 (McGraw-Hill, New York) by W. Silfvast]. Each pulse of source 18 may comprise a single pulse or a train of pulses such as generated by a mode locked Q-switched Nd:YAG laser. A single pulse train is referenced herein as a pulse sequence and a pulse and a pulse sequence are used herein interchangeably.

Source 18 may be configured in certain embodiments to generate two or four frequencies by techniques such as described in a review article entitled "Tunable, Coherent Sources For High-Resolution VUV and XUV Spectroscopy" by B. P. Stoicheff, J. R. Banic, P. Herman, W. Jamroz, P. E. LaRocque, and R. H. Lipson in *Laser Techniques for Extreme Ultraviolet Spectroscopy,* T. J. McIlrath and R. R. Freeman, Eds., (American Institute of Physics) p 19 (1982) and references therein. The techniques include for example second and third harmonic generation and parametric generation such as described in the articles entitled "Generation of Ultraviolet and Vacuum Ultraviolet Radiation" by S. E. Harris, J. F. Young, A. H. Kung, D. M. Bloom, and G. C. Bjorklund in *Laser Spectroscopy I,* R. G. Brewer and A. Mooradi, Eds. (Plenum Press, New York) p 59, (1974) and "Generation of Tunable Picosecond VUV Radiation" by A. H. Kung, *Appl. Phys. Lett.* 25, p 653 (1974). The contents of the three cited articles are herein incorporated in their entirety by reference.

The output beams from source 18 comprising two or four frequency components may be combined in beam-conditioner 22 by beam-splitters to form coextensive measurement and reference beams that are either spatially separated or coextensive as required in various embodiments. When source 18 is configured to furnish two or four frequency components, the frequency shifting of the various components required in certain embodiments may be introduced in source 18 for example by frequency modulation of input beams to parametric generators and the phase shifting of reference beams relative to measurement beams in beam-conditioner 22 may be achieved by phase shifters of the optical-mechanical type comprising for example prisms or mirrors and piezoelectric translators or of the electro-optical modulator type.

The general description is continued with reference to FIG. 1a. Input beam 24 is incident on interferometer 10 wherein reference beams and measurement beams are present in input beam 24 or are generated from input beam 24 in interferometer 10. The reference beams and measurement beams comprise two arrays of reference beams and two arrays of measurement beams wherein the arrays may comprise arrays of one element. The arrays of measurement beams are incident on or focused on and/or in substrate 60 and arrays of return measurement beams are generated by reflection and/or scattering or transmission by the substrate. In the case of single element arrays for the reference beams and measurement beams, the measurement beams are generally reflected or transmitted by substrate 60. The arrays of reference beams and return measurement beams are combined by a beamsplitter to form two arrays of output beam components. The arrays of output beam components are mixed with respect to state of polarization either in interferometer 10 or in detector 70. The arrays of output beams are subsequently focused to spots on pixels of a multi-pixel or single pixel detector as required and detected to generate electrical interference signal 72.

The conjugated quadratures of fields of return measurement beams are obtained by making a set of four measurements of the electrical interference signal 72. In single homodyne detection, for each of the four measurements of the electrical interference signal 72, a known sequence of phase shifts is introduced between the reference beam component and the return measurement beam component of the output beam 32. A sequence of phase shifts comprise 0, π/4, π/2, and 3π/2. For reference, the subsequent data processing procedure used to extract the conjugated quadratures of the reflected/scattered fields for an input beam comprising a single frequency component is described for example in U.S. Pat. No. 6,445,453 (ZI-14) entitled "Scanning Interferometric Near-Field Confocal Microscopy" by Henry A. Hill, the contents of which are incorporated herein in their entirety by reference.

Referring to the bi-homodyne detection method used in various embodiments, a set of four electrical interference signal values are obtained for each spot on and/or in substrate 60 being imaged. The set of four electrical interference signal values $S_j$, j=1, 2, 3, 4, used for obtaining conjugated quadratures of fields for a single a spot on and/or in a substrate being imaged is represented for the bi-homodyne detection within a scale factor by the formula $$S_j = P_j \begin{Bmatrix} \xi_j^2|A_1|^2 + \zeta_j^2|B_1|^2 + \eta_j^2|C_1|^2 + \zeta_j\eta_j 2|B_1||C_1|\cos\varphi_{B_1C_1\varepsilon_j} + \\ \xi_j\zeta_j 2|A_1||B_1|\cos\varphi_{A_1B_1\varepsilon_j} + \varepsilon_j\xi_j\eta_j 2|A_1||C_1|\cos\varphi_{A_1C_1} + \\ \xi_j^2|A_2|^2 + \zeta_j^2|B_2|^2 + \eta_j^2|C_2|^2 + \zeta_j\eta_j 2|B_2||C_2|\cos\varphi_{B_2C_2\gamma_j} + \\ \xi_j\zeta_j 2|A_2||B_2|\cos\varphi_{A_2B_2\gamma_j} + \gamma_j\xi_j\eta_j 2|A_2||C_2|\cos\varphi_{A_2C_2} \end{Bmatrix} \quad (1)$$

where coefficients $A_1$ and $A_2$ represent the amplitudes of the reference beams corresponding to the first and second frequency components of the input beam; coefficients $B_1$ and $B_2$ represent the amplitudes of background beams corresponding to reference beams $A_1$ and $A_2$, respectively; coefficients $C_1$ and $C_2$ represent the amplitudes of the return measurement beams corresponding to reference beams $A_1$ and $A_2$, respectively; $P_j$ represents the integrated intensity of the first frequency component of the input beam in pulse j of the pulse sequence; and the values for $\epsilon_j$ and $\gamma_j$ are listed in Table 1. The change in the values of $\epsilon_j$ and $\gamma_j$ from 1 to −1 or from −1 to 1 correspond to changes in relative phases of respective reference and measurement beams. The coefficients $\xi_j$, $\zeta_j$, and $\eta_j$ represent effects of variations in properties of a conjugate set of four pinholes such as size and shape if used in the generation of the spot on and/or in substrate 60 and the sensitivities of a conjugate set of four detector pixels corresponding to the spot on and/or in substrate 60 for the reference beam, the background beam, and the return measurement beam, respectively.

TABLE 1

| j | $\epsilon_j$ | $\gamma_j$ | $\epsilon_j\gamma_j$ |
|---|---|---|---|
| 1 | 1 | 1 | 1 |
| 2 | −1 | −1 | 1 |
| 3 | −1 | 1 | −1 |
| 4 | 1 | −1 | −1 |

It is assumed in Equation (1) that the ratio of $|A_2|/|A_1|$ is not dependent on j or on the value of $P_j$. In order to simplify the representation of $S_j$ so as to project the important features without departing from either the scope or spirit of the present invention, it is also assumed in Equation (1) that the ratio of the amplitudes of the return measurement beams corresponding to $A_2$ and $A_1$ is not dependent on j or on the value of $P_j$. However, the ratio $|C_2|/|C_1|$ will be different from the ratio $|A_2|/|A_1|$ when the ratio of the amplitudes of the measurement beam components corresponding to $A_2$ and $A_1$ are different from the ratio $|A_2|/|A_1|$.

Noting that $\cos\phi_{A_2C_2} = \pm\sin\phi_{A_1C_1}$ by the control of the relative phase shifts between corresponding reference and return measurement beam components in beam 32, Equation (1) may be rewritten as $$S_j = P_j \begin{Bmatrix} \xi_j^2(|A_1|^2+|A_2|^2) + \zeta_j^2(|B_1|^2+|B_2|^2) + \eta_j^2(|C_1|^2+|C_2|^2) + \\ 2\xi_j\zeta_j(|A_1||B_1|\cos\varphi_{A_1B_1\varepsilon_j} + |A_2||B_2|\cos\varphi_{A_2B_2\gamma_j}) + \\ 2\xi_j\eta_j\begin{bmatrix} \varepsilon_j|A_1||C_1|\cos\varphi_{A_1C_1} + \\ \gamma_j\left(\frac{|A_2|}{|A_1|}\right)\left(\frac{|C_2|}{|C_1|}\right)|A_1||C_1|\sin\varphi_{A_1C_1} \end{bmatrix} + \\ 2\zeta_j\eta_j\begin{pmatrix} \varepsilon_j|B_1||C_1|\cos\varphi_{B_1C_1\varepsilon_j} + \\ \gamma_j|B_2||C_2|\cos\varphi_{B_2C_2\gamma_j} \end{pmatrix} \end{Bmatrix} \quad (2)$$

where the relationship $\cos\phi_{A_2C_2}=\sin\phi_{A_1C_1}$ has been used without departing from either the scope or spirit of the present invention.

The change in phase $\phi_{A_1B_1\epsilon_j}$ for a change in $\epsilon_j$ and the change in phase $\phi_{A_2B_2\gamma_j}$ for a change in $\gamma_j$ may be different from π in embodiments depending on where and how the background beam is generated. It may be of value in evaluating the effects of the background beams to note that the factor $\cos\phi_{B_1C_1\epsilon_j}$ may be written as $\cos[\phi_{A_1C_1}+(\phi_{B_1C_1\epsilon_j}-\phi_{A_1C_1})]$ where the phase difference $(\phi_{B_1C_1\epsilon_j}-\phi_{A_1C_1})$ is the same as the phase $\phi_{A_1B_1\epsilon_j}$, i.e., $\cos\phi_{B_1C_1\epsilon_j}=\cos(\phi_{A_1C_1}+\phi_{A_1B_1\epsilon_j})$.

It is evident from inspection of Equation (2) that the term in Equation (2) corresponding to the component of conjugated quadratures $|C_1|\cos\phi_{A_1C_1}$ is a rectangular function that has a mean value of zero and is symmetric about j=2.5 since $\epsilon_j$ is symmetric about j 2.5. In addition the term in Equation (2) corresponding to the component of conjugated quadratures $|C_1|\sin\phi_{A_1C_1}$ in Equation (2) is a rectangular function that has a mean value of zero and is antisymmetric about j=2.5 since $\gamma_j$ is a antisymmetric function about j=2.5. Another important property by the design of the bi-homodyne detection method is that the conjugated quadratures $|C_1|\cos\phi_{A_1C_1}$ and $|C_1|\sin\phi_{A_1C_1}$ terms are orthogonal over the range of j=1, 2, 3, 4 since $\epsilon_j$ and $\gamma_j$ are orthogonal over the range of j=1, 2, 3, 4, i.e., $\sum_{j=1}^{4} \varepsilon_j \gamma_j = 0.$ (3)

Information about conjugated quadratures $|C_1|\cos \phi_{A_1C_1}$ and $|C_1|\sin \phi_{A_1C_1}$ are obtained using the symmetric and antisymmetric properties and orthogonality property of the conjugated quadratures terms in Equation (2) as represented by the following digital filters applied to the signal values $S_j$:

$$F_1(S) = \qquad (3)$$

$$\sum_{j=1}^{4} \varepsilon_j \frac{S_j}{P'_j \xi'^2_j} = (|A_1|^2 + |A_2|^2) \sum_{j=1}^{4} \varepsilon_j \left(\frac{P_j}{P'_j}\right)\left(\frac{\xi^2_j}{\xi'^2_j}\right) + (|B_1|^2 + |B_2|^2)$$

$$\sum_{j=1}^{4} \varepsilon_j \left(\frac{P_j}{P'_j}\right)\left(\frac{\zeta^2_j}{\xi'^2_j}\right) + (|C_1|^2 + |C_2|^2) \sum_{j=1}^{4} \varepsilon_j \left(\frac{P_j}{P'_j}\right)\left(\frac{\eta^2_j}{\xi'^2_j}\right) +$$

$$2|A_1||C_1|\cos\varphi_{A_1C_1} \sum_{j=1}^{4} \varepsilon_j \left(\frac{P_j}{P'_j}\right)\left(\frac{\xi_j \eta_j}{\xi'^2_j}\right) +$$

$$2\left(\frac{|A_2|}{|A_1|}\right)\left(\frac{|C_2|}{|C_1|}\right)|A_1||C_1|\sin\varphi_{A_1C_1} \sum_{j=1}^{4} \varepsilon_j \gamma_j \left(\frac{P_j}{P'_j}\right)\left(\frac{\xi_j \eta_j}{\xi'^2_j}\right) +$$

$$2|A_1||B_1| \sum_{j=1}^{4} \varepsilon_j \left(\frac{P_j}{P'_j}\right)\left(\frac{\xi_j \zeta_j}{\xi'^2_j}\right)\cos\varphi_{A_1B_1\varepsilon_j} +$$

$$2|A_2||B_2| \sum_{j=1}^{4} \varepsilon_j \left(\frac{P_j}{P'_j}\right)\left(\frac{\xi_j \zeta_j}{\xi'^2_j}\right)\cos\varphi_{A_2B_2\gamma_j} +$$

$$2|B_1||C_1| \sum_{j=1}^{4} \left(\frac{P_j}{P'_j}\right)\left(\frac{\zeta_j \eta_j}{\xi'^2_j}\right)\cos\varphi_{B_1C_1\varepsilon_j} +$$

$$2|B_2||C_2| \sum_{j=1}^{4} \varepsilon_j \gamma_j \left(\frac{P_j}{P'_j}\right)\left(\frac{\zeta_j \eta_j}{\xi'^2_j}\right)\cos\varphi_{B_2C_2\gamma_j},$$

$$F_2(S) = \qquad (4)$$

$$\sum_{j=1}^{4} \gamma_j \frac{S_j}{P'_j \xi'^2_j} = (|A_1|^2 + |A_2|^2) \sum_{j=1}^{4} \gamma_j \left(\frac{P_j}{P'_j}\right)\left(\frac{\xi^2_j}{\xi'^2_j}\right) + (|B_1|^2 + |B_2|^2)$$

$$\sum_{j=1}^{4} \gamma_j \left(\frac{P_j}{P'_j}\right)\left(\frac{\zeta^2_j}{\xi'^2_j}\right) + (|C_1|^2 + |C_2|^2) \sum_{j=1}^{4} \gamma_j \left(\frac{P_j}{P'_j}\right)\left(\frac{\eta^2_j}{\xi'^2_j}\right) +$$

$$2|A_1||C_1|\cos\varphi_{A_1C_1} \sum_{j=1}^{4} \varepsilon_j \gamma_j \left(\frac{P_j}{P'_j}\right)\left(\frac{\xi_j \eta_j}{\xi'^2_j}\right) +$$

$$2\left(\frac{|A_2|}{|A_1|}\right)\left(\frac{|C_2|}{|C_1|}\right)|A_1||C_1|\sin\varphi_{A_1C_1} \sum_{j=1}^{4} \left(\frac{P_j}{P'_j}\right)\left(\frac{\xi_j \eta_j}{\xi'^2_j}\right) +$$

$$2|A_1||B_1| \sum_{j=1}^{4} \gamma_j \left(\frac{P_j}{P'_j}\right)\left(\frac{\xi_j \zeta_j}{\xi'^2_j}\right)\cos\varphi_{A_1B_1\varepsilon_j} +$$

-continued $$2|A_2||B_2| \sum_{j=1}^{4} \gamma_j \left(\frac{P_j}{P'_j}\right)\left(\frac{\xi_j \zeta_j}{\xi'^2_j}\right)\cos\varphi_{A_2B_2\gamma_j} +$$

$$2|B_1||C_1| \sum_{j=1}^{4} \varepsilon_j \gamma_j \left(\frac{P_j}{P'_j}\right)\left(\frac{\zeta_j \eta_j}{\xi'^2_j}\right)\cos\varphi_{B_1C_1\varepsilon_j} +$$

$$2|B_2||C_2| \sum_{j=1}^{4} \left(\frac{P_j}{P'_j}\right)\left(\frac{\zeta_j \eta_j}{\xi'^2_j}\right)\cos\varphi_{B_2C_2\gamma_j}$$

where $\xi'_j$ and $P'_j$ are values used in the digital filters to represent $\xi_j$ and $P_j$.

The parameter $$\left[\left(\frac{|A_2|}{|A_1|}\right)\left(\frac{|C_2|}{|C_1|}\right)\right] \qquad (5)$$

in Equations (3) and (4) needs to be determined in order complete the determination of a conjugated quadratures. The parameter given in Equation (5) can be measured for example by introducing $\pi/2$ phase shifts into the relative phase of the reference beam and the measurement beam and repeating the measurement for the conjugated quadratures. The ratio of the amplitudes of the conjugated quadratures corresponding to $(\sin \phi_{A_1C_1}/\cos \phi_{A_1C_1})$ from the first measurement divided by the ratio of the amplitudes of the conjugated quadratures corresponding to $(\sin \phi_{A_1C_1}/\cos \phi_{A_1C_1})$ from the second measurement is equal to $$\left[\left(\frac{|A_2|}{|A_1|}\right)\left(\frac{|C_2|}{|C_1|}\right)\right]^2. \qquad (6)$$

Note that certain of the factors in Equations (3) and (4) have nominal values of 4 within a scale factor, e.g., $$\sum_{j=1}^{4} \left(\frac{P_j}{P'_j}\right)\left(\frac{\xi_j \eta_j}{\xi'^2_j}\right) \simeq 4, \sum_{j=1}^{4} \left(\frac{P_j}{P'_j}\right)\left(\frac{\xi_j \eta_j}{\xi'^2_j}\right) \simeq 4. \qquad (7)$$

The scale factors correspond to the average values for the ratios of $\xi'_j/\eta_j$ and $\xi'_j/\zeta_j$, respectively, assuming that the average value of $P_j/P'_j \cong 1$. Certain other of the factors in Equations (3) and (4) have nominal values of zero, e.g., $$\sum_{j=1}^{4} \varepsilon_j \left(\frac{P_j}{P'_j}\right)\left(\frac{\xi^2_j}{\xi'^2_j}\right) \simeq 0, \sum_{j=1}^{4} \varepsilon_j \left(\frac{P_j}{P'_j}\right)\left(\frac{\zeta^2_j}{\xi'^2_j}\right) \simeq 0, \qquad (8)$$

$$\sum_{j=1}^{4} \varepsilon_j \left(\frac{P_j}{P'_j}\right)\left(\frac{\eta^2_j}{\xi'^2_j}\right) \simeq 0, \sum_{j=1}^{4} \gamma_j \left(\frac{P_j}{P'_j}\right)\left(\frac{\xi^2_j}{\xi'^2_j}\right) \simeq 0,$$

-continued $$\sum_{j=1}^{4} \gamma_j \left(\frac{P_j}{P'_j}\right)\left(\frac{\zeta_j^2}{\xi'^2_j}\right) \simeq 0, \quad \sum_{j=1}^{4} \gamma_j \left(\frac{P_j}{P'_j}\right)\left(\frac{\eta_j^2}{\xi'^2_j}\right) \simeq 0,$$

$$\sum_{j=1}^{4} \varepsilon_j \gamma_j \left(\frac{P_j}{P'_j}\right)\left(\frac{\xi_j \eta_j}{\xi'^2_j}\right) \simeq 0.$$

The remaining factors, $$\sum_{j=1}^{4} \varepsilon_j \left(\frac{P_j}{P'_j}\right)\left(\frac{\xi_j \zeta_j}{\xi'^2_j}\right) \cos\varphi_{A_1B_1\varepsilon_j}, \quad \sum_{j=1}^{4} \varepsilon_j \left(\frac{P_j}{P'_j}\right)\left(\frac{\xi_j \zeta_j}{\xi'^2_j}\right) \cos\varphi_{A_2B_2\gamma_j},$$

$$\sum_{j=1}^{4} \left(\frac{P_j}{P'_j}\right)\left(\frac{\zeta_j \eta_j}{\xi'^2_j}\right) \cos\varphi_{B_1C_1\varepsilon_j}, \quad \sum_{j=1}^{4} \varepsilon_j \gamma_j \left(\frac{P_j}{P'_j}\right)\left(\frac{\zeta_j \eta_j}{\xi'^2_j}\right) \cos\varphi_{B_2C_2\gamma_j},$$

$$\sum_{j=1}^{4} \gamma_j \left(\frac{P_j}{P'_j}\right)\left(\frac{\xi_j \zeta_j}{\xi'^2_j}\right) \cos\varphi_{A_1B_1\varepsilon_j}, \quad \sum_{j=1}^{4} \gamma_j \left(\frac{P_j}{P'_j}\right)\left(\frac{\xi_j \zeta_j}{\xi'^2_j}\right) \cos\varphi_{A_2B_2\gamma_j},$$

$$\sum_{j=1}^{4} \varepsilon_j \gamma_j \left(\frac{P_j}{P'_j}\right)\left(\frac{\zeta_j \eta_j}{\xi'^2_j}\right) \cos\varphi_{B_1C_1\varepsilon_j}, \quad \sum_{j=1}^{4} \left(\frac{P_j}{P'_j}\right)\left(\frac{\zeta_j \eta_j}{\xi'^2_j}\right) \cos\varphi_{B_2C_2\gamma_j},$$

will have nominal magnitudes ranging from approximately zero to approximately 4 times a cosine factor and either the average value of factor $(P_j/P'_j)(\xi_j\zeta_j/\xi'^2_j)$ or $(P_j/P'_j)(\zeta_j\eta_j/\xi'^2_j)$ depending on the properties respective phases. For the portion of the background with phases that do not track to a first approximation the phases of the respective measurement beams, the magnitudes of all of the terms listed in the Equation (9) will be approximately zero. For the portion of the background with phases that do track to a first approximation the phases of the respective measurement beams, the magnitudes of the terms listed in Equation (9) will be approximately 4 times a cosine factor and either the average value of factor $(P_j/P'_j)(\xi_j\zeta_j/\xi'^2_j)$ and or factor $(P_j/P'_j)(\zeta_j\eta_j/\xi'^2_j)$.

The two largest terms in Equations (3) and (4) are generally the terms that have the factors $(|A_1|^2+|A_2|^2)$ and $(|B_1|^2+|B_2|^2)$. However, the corresponding terms are substantially eliminated in various embodiments by selection of $\xi'_j$ values for the terms that have $(|A_1|^2+|A_2|^2)$ as a factor and by the design of $\zeta_j$ values for the terms that have $(|B_1|^2+|B_2|^2)$ as a factor as shown in Equation (8).

The largest contribution from effects of background is represented by the contribution to the interference term between the reference beam and the portion of the background beam generated by the measurement beam 30A. This portion of the effect of the background can be measured by measuring the corresponding conjugated quadratures of the portion of the background with the return measurement beam component of beam 32 set equal to zero, i.e., measuring the respective electrical interference signals $S_j$ with substrate 60 removed and with either $|A_2|=0$ or $|A_1|=0$ and visa versa. The measured conjugated quadratures of the portion of the effect of the background can then be used to compensate for the respective background effects beneficially in an end use application if required.

Information about the largest contribution from effects of background amplitude $2\xi_j\zeta_j|A_1||B_1|$ and phase $\varphi_{A_1B_1\varepsilon_j}$, i.e., the interference term between the reference beam and the portion of background beam generated by the measurement beam 30A, may be obtained by measuring $S_j$ for j=1, 2, 3, 4 as a function of relative phase shift between reference beam and the measurement beam 30A with substrate 60 removed and either $|A_2|=0$ or $|A_1|=0$ and visa versa and Fourier analyzing the measured values of $S_j$. Such information can be used to help identify the origin of the respective background.

Other techniques may be incorporated into embodiments to reduce and/or compensate for the effects of background beams without departing from either the scope or spirit of the present invention such as described in commonly owned U.S. Pat. No. 5,760,901 entitled "Method And Apparatus For Confocal Interference Microscopy With Background Amplitude Reduction and Compensation," U.S. Pat. No. 5,915,048 entitled "Method and Apparatus for Discrimination In-Focus Images from Out-of-Focus Light Signals from Background and Foreground Light Sources," and U.S. Pat. No. 6,480,285 B1 wherein each of three patents are by Henry A. Hill. The contents of each of the three cited patents are herein incorporated in their entirety by reference.

The selection of values for $\xi'_j$ is based on information about coefficients $\xi_j$ for j=1, 2, 3, 4 that may be obtained by measuring the $S_j$ for j=1, 2, 3, 4 with only the reference beam present in the interferometer system. In certain embodiments, this may correspond simply blocking the measurement beam components of input beam 24 and in certain other embodiments, this may correspond to simply measuring the $S_j$ for j=1, 2, 3, 4 with substrate 60 removed. A test of the correctness of a set of values for $\xi'_j$ is the degree to which the $(|A_1|^2+|A_2|^2)$ terms in Equations (3) and (4) are zero.

Information about coefficients $\xi_j\eta_j$ for j=1, 2, 3, 4 may be obtained by scanning an artifact past the spots corresponding to the respective four conjugate detector pixels with either $|A_2|=0$ or $|A_1|=0$ and measuring the conjugated quadratures component $2|A_1||C_1|\cos\phi_{A_1C_1}$ or $2|A_1||C_1|\sin\phi_{A_1C_1}$, respectively. A change in the amplitude of the $2|A_1||C_1|\cos\phi_{A_1C_1}$ or $2|A_1||C_1|\sin\phi_{A_1C_1}$ term corresponds to a variation in $\xi_j\eta_j$ as a function of j. Information about the coefficients $\xi_j\eta_j$ for j=1, 2, 3, 4 may be used for example to monitor the stability of one or more elements of interferometer system 10.

The bi-homodyne detection method described herein is a robust technique for the determination of conjugated quadratures of fields. First, the conjugated quadratures $|C_1|\cos\phi_{A_1C_1}$ and $|C_1|\sin\phi_{A_1C_1}$ are the primary terms in the digitally filtered values $F_1(S)$ and $F_2(S)$, respectively, as expressed by Equations (3) and (4), respectively, since as noted in the discussion with respect to Equation (8), the terms with the factors $(|A_1|^2+|A_2|^2)$ and $(|B_1|^2+|B_2|^2)$ are substantially zero.

Secondly, the coefficients of $|C_1|\cos\phi_{A_1C_1}$ and $|C_2|\sin\phi_{A_1C_1}$ terms in Equations (3) and (4) are identical. Thus highly accurate measurements of the interference terms between the return measurement beam and the reference beam with respect to amplitudes and phases, i.e., highly accurate measurements of conjugated quadratures of fields can be measured wherein first order variations in $\xi_j$ and first order errors in normalizations such as $(P_j/P'_j)$ and $(\xi_j^2/\xi'^2_j)$ enter in only second or higher order. This property translates into a significant advantage. Also, the contributions to each component of the conjugated quadratures $|C_1|\cos\phi_{A_1C_1}$ and $|C_2|\sin\phi_{A_1C_1}$ from a respective set of four electrical interference signal values have the same window function and thus are obtained as jointly determined values.

Other distinguishing features of the bi-homodyne technique described herein are evident in Equations (3) and (4): the coefficients of the conjugated quadratures $|C_1|\cos\phi_{A_1C_1}$ and $|C_1|\sin\phi_{A_1C_1}$ in Equations (3) and (4), respectively, corresponding to the first equation of Equations (7) are identical independent of errors in assumed values for $\xi'_j$; the coefficients of the conjugated quadratures $|C_1|\sin\phi_{A_1C_1}$ and $|C_1|\cos\phi_{A_1C_1}$ Equations (3) and (4), respectively, corresponding to the fourth equation of Equations (8) are identical independent of errors in assumed values for $\xi'_j$. Thus highly accurate values of the phases corresponding to conjugated quadratures can be measured with first order variations in $\xi_j$ and first order errors in normalizations such as $(P_j/P'_j)$ and $(\xi_j^2/\xi'^2_j)$ enter in only through some high order effect.

It is also evident that since the conjugated quadratures of fields are obtained jointly when using the bi-homodyne detection method, there is a significant reduction in the potential for an error in tracking phase as a result of a phase redundancy unlike the situation possible in single-homodyne detection of conjugated quadratures of fields.

There are a number of advantages of the bi-homodyne detection method described herein as a consequence of the conjugated quadratures of fields being jointly acquired quantities. One advantage is a reduced sensitivity the effects of an overlay error of a spot in or on the substrate that is being imaged and a conjugate image of conjugate pixel of a multi-pixel detector during the acquisition of four electrical interference signal values of each spot in and/or on a substrate imaged using interferometric far-field and/or near-field confocal and non-confocal microscopy. Overlay errors are errors in the set of four conjugate images of a respective set of conjugate detector pixels relative to the spot being imaged.

Another advantage is that when operating in the scanning mode there is a reduced sensitivity to effects of pinhole-to-pinhole variations in properties of a conjugate set of pinholes used in a confocal microscopy system that are conjugate to a spot in or on the substrate being imaged at different times during the scan.

Another advantage is that when operating in the scanning mode there is a reduced sensitivity to effects of pixel-to-pixel variation of properties within a set of conjugate pixels that are conjugate to a spot in or on the substrate being imaged at different times during the scan.

Another advantage is that when operating in the scanning mode there is reduced sensitivity to effects of pulse sequence to pulse sequence variations of a respective conjugate set of pulse sequences of the input beam 24 to the interferometer system.

The pinholes and pixels of a multi-pixel detector of a set of conjugate pinholes and conjugate pixels of a multi-pixel detector may comprise contiguous pinholes of an array of pinholes and/or contiguous pixels of a multi-pixel detector or may comprise selected pinholes from an array of pinholes and/or pixels from an array of pixels wherein the separation between the selected pinholes is an integer number of pinhole spacings and the separation between an array of respective pixels corresponds to an integer number of pixel spacings without loss of lateral and/or longitudinal resolution and signal-to-noise ratios. The corresponding scan rate would be equal to the integer times the spacing of spots on the measurement object 60 conjugate to set of conjugate pinholes and/or set of conjugate pixels divided by the read out rate of the multi-pixel detector. This property permits a significant increase in throughput for an interferometric far-field or near-field confocal or non-confocal microscope with respect to the number of spots in and/or on a substrate imaged per unit time.

Referring to the quad-homodyne detection method used in various embodiments described herein, a set of four electrical interference signal values are obtained for each spot on and/or in substrate 60 being imaged with two pulse sequences from source 18 and beam-conditioner 22. The set of four electrical interference signal values $S_j$, j=1, 2, 3, 4 used for obtaining conjugated quadratures of fields for a single a spot on and/or in a substrate being imaged is represented for the quad-homodyne detection within a scale factor by the formulae $$S_1 = P_1 \begin{cases} \xi_1^2|A_1|^2 + \zeta_1^2|B_1|^2 + \eta_1^2|C_1|^2 + \zeta_1\eta_1 2|B_1||C_1|\cos\varphi_{B_1C_1\varepsilon_1} + \\ \xi_1\zeta_1 2|A_1||B_1|\cos\varphi_{A_1B_1\varepsilon_1} + \varepsilon_1\xi_1\eta_1 2|A_1||C_1|\cos\varphi_{A_1C_1} + \\ \xi_1^2|A_2|^2 + \zeta_1^2|B_2|^2 + \eta_1^2|C_2|^2 + \zeta_1\eta_1 2|B_2||C_2|\cos\varphi_{B_2C_2\gamma_1} + \\ \xi_1\zeta_1 2|A_2||B_2|\cos\varphi_{A_2B_2\gamma_1} + \gamma_1\xi_1\eta_1 2|A_2||C_2|\cos\varphi_{A_2C_2} \end{cases}, \quad (10)$$

$$S_2 = P_1 \begin{cases} \xi_2^2|A_3|^2 + \zeta_2^2|B_3|^2 + \eta_2^2|C_3|^2 + \zeta_2\eta_2 2|B_3||C_3|\cos\varphi_{B_3C_3\varepsilon_2} + \\ \xi_2\zeta_2 2|A_3||B_3|\cos\varphi_{A_3B_3\varepsilon_2} + \varepsilon_2\xi_2\eta_2 2|A_3||C_3|\cos\varphi_{A_3C_3} + \\ \xi_2^2|A_4|^2 + \zeta_2^2|B_4|^2 + \eta_2^2|C_4|^2 + \zeta_2\eta_2 2|B_4||C_4|\cos\varphi_{B_4C_4\gamma_2} + \\ \xi_2\zeta_2 2|A_4||B_4|\cos\varphi_{A_4B_4\gamma_2} + \gamma_2\xi_2\eta_2 2|A_4||C_4|\cos\varphi_{A_4C_4} \end{cases}, \quad (11)$$

$$S_3 = P_2 \begin{cases} \xi_1^2|A_1|^2 + \zeta_1^2|B_1|^2 + \eta_1^2|C_1|^2 + \zeta_1\eta_1 2|B_1||C_1|\cos\varphi_{B_1C_1\varepsilon_3} + \\ \xi_1\zeta_1 2|A_1||B_1|\cos\varphi_{A_1B_1\varepsilon_3} + \varepsilon_3\xi_1\eta_1 2|A_1||C_1|\cos\varphi_{A_1C_1} + \\ \xi_1^2|A_2|^2 + \zeta_1^2|B_2|^2 + \eta_1^2|C_2|^2 + \zeta_1\eta_1 2|B_2||C_2|\cos\varphi_{B_2C_2\gamma_3} + \\ \xi_1\zeta_1 2|A_2||B_2|\cos\varphi_{A_2B_2\gamma_3} + \gamma_3\xi_1\eta_1 2|A_2||C_2|\cos\varphi_{A_2C_2} \end{cases}, \quad (12)$$

$$S_4 = P_2 \begin{cases} \xi_2^2|A_3|^2 + \zeta_2^2|B_3|^2 + \eta_2^2|C_3|^2 + \zeta_2\eta_2 2|B_3||C_3|\cos\varphi_{B_3C_3\varepsilon_4} + \\ \xi_2\zeta_2 2|A_3||B_3|\cos\varphi_{A_3B_3\varepsilon_4} + \varepsilon_4\xi_2\eta_2 2|A_3||C_3|\cos\varphi_{A_3C_3} + \\ \xi_2^2|A_4|^2 + \zeta_2^2|B_4|^2 + \eta_2^2|C_4|^2 + \zeta_2\eta_2 2|B_4||C_4|\cos\varphi_{B_4C_4\gamma_4} + \\ \xi_2\zeta_2 2|A_4||B_4|\cos\varphi_{A_4B_4\gamma_4} + \gamma_4\xi_2\eta_2 2|A_4||C_4|\cos\varphi_{A_4C_4} \end{cases}, \quad (13)$$

where coefficients $A_1$, $A_2$, $A_3$, and $A_4$ represent the amplitudes of the reference beams corresponding to the first, second, third, and fourth frequency components, respectively, of input beam 24; coefficients $B_1$, $B_2$, $B_3$, and $B_4$ represent the amplitudes of background beams corresponding to reference beams $A_1$, $A_2$, $A_3$, and $A_4$, respectively; coefficients $C_1$, $C_2$, $C_3$, and $C_4$ represent the amplitudes of the return measurement beams corresponding to reference beams $A_1$, $A_2$, $A_3$, and $A_4$, respectively; $P_1$ and $P_2$ represent the integrated intensities of the first frequency component in the first and second pulse sequences, respectively, of the input beam 24; and the values for $\epsilon_j$ and $\gamma_j$ are listed in Table 1. The description of the coefficients $\xi_j$, $\zeta_j$, and $\eta_j$ for the quad-homodyne detection method is the same as the corresponding portion of the description given for $\xi_j$, $\zeta_j$, and $\eta_j$ of the bi-homodyne detection method.

It is assumed in Equations (10), (11), (12), and (13) that the ratios of $|A_2|/|A_1|$ and $|A_4|/|A_3|$ are not dependent on j or the value of $P_j$. In order to simplify the representation of $S_j$ so as to project the important features without departing from either the scope or spirit of the present invention, it is also assumed in Equations (10), (11), (12), and (13) that the ratios of the amplitudes of the return measurement beams corresponding to $|A_2|/|A_1|$ and $|A_4|/|A_3|$ are not dependent on j or the value of $P_j$. However, the ratios $|C_2|/|C_1|$ and $|C_4|/|C_3|$ will be different from the ratios $|A_2|/|A_1|$ and $|A_4|/|A_3|$, respectively, when the ratio of the amplitudes of the measurement beam components corresponding to $|A_2|/|A_1|$ and $|A_4|/|A_3|$, respectively, are different from the ratios $|A_2|/|A_1|$ and $|A_4|/|A_3|$, respectively.

Noting that $\cos\phi_{A_2C_2}=\pm\sin\phi_{A_1C_1}$ by the control of the relative phase shifts between corresponding reference and measurement beam components in beam 32, Equations (10), (11), (12), and (13) may be written, respectively, as $$S_1 = P_1 \left\{ \begin{array}{l} \xi_1^2(|A_1|^2+|A_2|^2)+\zeta_1^2(|B_1|^2+|B_2|^2)+\eta_1^2(|C_1|^2+|C_2|^2)+ \\ 2\xi_1\eta_1[|B_1||C_1|\cos\varphi_{B_1C_1\varepsilon_1}+|B_2||C_2|\cos\varphi_{B_2C_2\gamma_1}]+ \\ 2\xi_1\eta_1 \left[ \begin{array}{l} \varepsilon_1|A_1||C_1|\cos\varphi_{A_1C_1}+ \\ \gamma_1\left(\frac{|A_2|}{|A_1|}\right)\left(\frac{|C_2|}{|C_1|}\right)|A_1||C_1|\sin\varphi_{A_1C_1} \end{array} \right]+ \\ 2\xi_1\zeta_1[|A_1||B_1|\cos\varphi_{A_1B_1\varepsilon_1}+|A_2||B_2|\cos\varphi_{A_2B_2\gamma_1}] \end{array} \right\}, \quad (14)$$

$$S_2 = P_1 \left\{ \begin{array}{l} \xi_2^2(|A_3|^2+|A_4|^2)+\zeta_2^2(|B_3|^2+|B_4|^2)+\eta_2^2(|C_3|^2+|C_4|^2)+ \\ 2\xi_2\eta_2[|B_3||C_3|\cos\varphi_{B_3C_3\varepsilon_2}+|B_4||C_4|\cos\varphi_{B_4C_4\gamma_2}]+ \\ 2\xi_2\eta_2\left(\frac{|A_3|}{|A_1|}\right)\left(\frac{|C_3|}{|C_1|}\right) \left[ \begin{array}{l} \varepsilon_2|A_1||C_1|\cos\varphi_{A_1C_1}+ \\ \gamma_2\left(\frac{|A_4|}{|A_3|}\right)\left(\frac{|C_4|}{|C_3|}\right)|A_1||C_1|\sin\varphi_{A_1C_1} \end{array} \right]+ \\ 2\xi_2\zeta_2[|A_3||B_3|\cos\varphi_{A_3B_3\varepsilon_2}+|A_4||B_4|\cos\varphi_{A_4B_4\gamma_2}] \end{array} \right\}, \quad (15)$$

$$S_3 = P_2 \left\{ \begin{array}{l} \xi_1^2(|A_1|^2+|A_2|^2)+\zeta_1^2(|B_1|^2+|B_2|^2)+\eta_1^2(|C_1|^2+|C_2|^2)+ \\ 2\xi_1\eta_1[|B_1||C_1|\cos\varphi_{B_1C_1\varepsilon_3}+|B_2||C_2|\cos\varphi_{B_2C_2\gamma_3}]+ \\ 2\xi_1\eta_1 \left[ \begin{array}{l} \varepsilon_3|A_1||C_1|\cos\varphi_{A_1C_1}+ \\ \gamma_3\left(\frac{|A_2|}{|A_1|}\right)\left(\frac{|C_2|}{|C_1|}\right)|A_1||C_1|\sin\varphi_{A_1C_1} \end{array} \right]+ \\ 2\xi_1\zeta_1[|A_1||B_1|\cos\varphi_{A_1B_1\varepsilon_3}+|A_2||B_2|\cos\varphi_{A_2B_2\gamma_3}] \end{array} \right\}, \quad (16)$$

$$S_4 = P_2 \left\{ \begin{array}{l} \xi_2^2(|A_3|^2+|A_4|^2)+\zeta_2^2(|B_3|^2+|B_4|^2)+\eta_2^2(|C_3|^2+|C_4|^2)+ \\ 2\xi_2\eta_2[|B_3||C_3|\cos\varphi_{B_3C_3\varepsilon_4}+|B_4||C_4|\cos\varphi_{B_4C_4\gamma_4}]+ \\ 2\xi_2\eta_2\left(\frac{|A_3|}{|A_1|}\right)\left(\frac{|C_3|}{|C_1|}\right) \left[ \begin{array}{l} \varepsilon_4|A_1||C_1|\cos\varphi_{A_1C_1}+ \\ \gamma_4\left(\frac{|A_4|}{|A_3|}\right)\left(\frac{|C_4|}{|C_3|}\right)|A_1||C_1|\sin\varphi_{A_1C_1} \end{array} \right]+ \\ 2\xi_2\zeta_2[|A_3||B_3|\cos\varphi_{A_3B_3\varepsilon_4}+|A_4||B_4|\cos\varphi_{A_4B_4\gamma_4}] \end{array} \right\}, \quad (17)$$

where the relationship $\cos\phi_{A_2C_2}=\sin\phi_{A_1C_1}$ has been used without departing from either the scope or spirit of the present invention.

Information about the conjugated quadratures $|C_1|\cos\phi_{A_1C_1}$ and $|C_1|\sin\phi_{A_1C_1}$ are obtained using the symmetric and antisymmetric properties and orthogonality property of the conjugated quadratures as represented by the following digital filters applied to the signal values $S_j$:

$$F_3(S) = \left(\frac{1}{P_1'}\right)\left(\frac{S_1}{\xi_1'^2}-\frac{S_2}{\xi_2'^2}\right)-\left(\frac{1}{P_2'}\right)\left(\frac{S_3}{\xi_1'^2}-\frac{S_4}{\xi_2'^2}\right), \quad (18)$$

$$F_4(S) = \left(\frac{1}{P_1'}\right)\left(\frac{S_1}{\xi_1'^2}-\frac{S_2}{\xi_2'^2}\right)+\left(\frac{1}{P_2'}\right)\left(\frac{S_3}{\xi_1'^2}-\frac{S_4}{\xi_2'^2}\right). \quad (19)$$

The description of $\xi_j'$ and $P_j'$ for the quad-homodyne detection method is the same as the corresponding description given for $\xi_j'$ and $P_j'$ in the bi-homodyne detection method. Using Equations (14), (15) (16), (17), (18), and (19), the following expressions are obtained for the filtered quantities containing components of the conjugated quadratures $|C_1|\cos\phi_{A_1C_1}$ and $|C_1|\sin\phi_{A_1C_1}$:

$$F_3(S) = \left(\frac{P_1}{P_1'}-\frac{P_2}{P_2'}\right)\left[(|A_1|^2+|A_2|^2)\left(\frac{\xi_1^2}{\xi_1'^2}\right)-(|A_3|^2+|A_4|^2)\left(\frac{\xi_2^2}{\xi_2'^2}\right)\right]+ \quad (20)$$

$$\left(\frac{P_1}{P_1'}-\frac{P_2}{P_2'}\right)\left[(|B_1|^2+|B_2|^2)\left(\frac{\zeta_1^2}{\xi_1'^2}\right)-(|B_3|^2+|B_4|^2)\left(\frac{\zeta_2^2}{\xi_2'^2}\right)\right]+$$

-continued $$\left(\frac{P_1}{P_1'}-\frac{P_2}{P_2'}\right)\left[(|C_1|^2+|C_2|^2)\left(\frac{\eta_1^2}{\xi_1'^2}\right)-(|C_3|^2+|C_4|^2)\left(\frac{\eta_2^2}{\xi_2'^2}\right)\right]+$$

$$2\left(\frac{P_1}{P_1'}-\frac{P_2}{P_2'}\right)\left[\left(\frac{\xi_1\eta_1}{\xi_1'^2}\right)+\left(\frac{\xi_2\eta_2}{\xi_2'^2}\right)\left(\frac{|A_3|}{|A_1|}\right)\left(\frac{|C_3|}{|C_1|}\right)\right]|A_1||C_1|\cos\varphi_{A_1C_1}+$$

$$2\left(\frac{P_1}{P_1'}-\frac{P_2}{P_2'}\right)\left(\frac{|A_2|}{|A_1|}\right)\left(\frac{|C_2|}{|C_1|}\right)\left[\left(\frac{\xi_1\eta_1}{\xi_1'^2}\right)+\left(\frac{\xi_2\eta_2}{\xi_2'^2}\right)\left(\frac{|A_4|}{|A_2|}\right)\left(\frac{|C_4|}{|C_2|}\right)\right]|A_1||C_1|$$

$$\sin\varphi_{A_1C_1}+2\left(\frac{P_1}{P_1'}\cos\varphi_{A_1B_1\varepsilon_1}-\frac{P_2}{P_2'}\cos\varphi_{A_1B_1\varepsilon_3}\right)\frac{\xi_1\zeta_1}{\xi_1'^2}|A_1||B_1|-$$

$$2\left(\frac{P_1}{P_1'}\cos\varphi_{A_3B_3\varepsilon_2}-\frac{P_2}{P_2'}\cos\varphi_{A_3B_3\varepsilon_4}\right)\frac{\xi_2\zeta_2}{\xi_2'^2}|A_3||B_3|+$$

$$2\left(\frac{P_1}{P_1'}\cos\varphi_{A_2B_2\gamma_1}-\frac{P_2}{P_2'}\cos\varphi_{A_2B_2\gamma_3}\right)\frac{\xi_1\zeta_1}{\xi_1'^2}|A_2||B_2|-$$

$$2\left(\frac{P_1}{P_1'}\cos\varphi_{A_4B_4\gamma_2}-\frac{P_2}{P_2'}\cos\varphi_{A_4B_4\gamma_4}\right)\frac{\xi_2\zeta_2}{\xi_2'^2}|A_4||B_4|+$$

$$2\left(\frac{P_1}{P_1'}\cos\varphi_{B_1C_1\varepsilon_1}-\frac{P_2}{P_2'}\cos\varphi_{B_1C_1\varepsilon_3}\right)\frac{\xi_1\zeta_1}{\xi_1'^2}|B_1||C_1|-$$

$$2\left(\frac{P_1}{P_1'}\cos\varphi_{B_3C_3\varepsilon_2}-\frac{P_2}{P_2'}\cos\varphi_{B_3C_3\varepsilon_4}\right)\frac{\xi_2\zeta_2}{\xi_2'^2}|B_3||C_3|+$$

$$2\left(\frac{P_1}{P_1'}\cos\varphi_{B_2C_2\gamma_1}-\frac{P_2}{P_2'}\cos\varphi_{B_2C_2\gamma_3}\right)\frac{\xi_1\zeta_1}{\xi_1'^2}|B_2||C_2|-$$

$$2\left(\frac{P_1}{P_1'}\cos\varphi_{B_4C_4\gamma_2}-\frac{P_2}{P_2'}\cos\varphi_{B_4C_4\gamma_4}\right)\frac{\xi_2\zeta_2}{\xi_2'^2}|B_4||C_4|,$$

$$F_4(S) = \left(\frac{P_1}{P_1'}-\frac{P_2}{P_2'}\right)\left[(|A_1|^2+|A_2|^2)\left(\frac{\xi_1^2}{\xi_1'^2}\right)-(|A_3|^2+|A_4|^2)\left(\frac{\xi_2^2}{\xi_2'^2}\right)\right]+$$

$$\left(\frac{P_1}{P_1'}-\frac{P_2}{P_2'}\right)\left[(|B_1|^2+|B_2|^2)\left(\frac{\zeta_1^2}{\xi_1'^2}\right)-(|B_3|^2+|B_4|^2)\left(\frac{\zeta_2^2}{\xi_2'^2}\right)\right]+$$

$$\left(\frac{P_1}{P_1'}-\frac{P_2}{P_2'}\right)\left[(|C_1|^2+|C_2|^2)\left(\frac{\eta_1^2}{\xi_1'^2}\right)-(|C_3|^2+|C_4|^2)\left(\frac{\eta_2^2}{\xi_2'^2}\right)\right]+$$

$$2\left(\frac{P_1}{P_1'}-\frac{P_2}{P_2'}\right)\left[\left(\frac{\xi_1\eta_1}{\xi_1'^2}\right)+\left(\frac{\xi_2\eta_2}{\xi_2'^2}\right)\left(\frac{|A_3|}{|A_1|}\right)\left(\frac{|C_3|}{|C_1|}\right)\right]|A_1||C_1|\cos\varphi_{A_1C_1}+$$

$$2\left(\frac{P_1}{P_1'}-\frac{P_2}{P_2'}\right)\left(\frac{|A_2|}{|A_1|}\right)\left(\frac{|C_2|}{|C_1|}\right)\left[\left(\frac{\xi_1\eta_1}{\xi_1'^2}\right)+\left(\frac{\xi_2\eta_2}{\xi_2'^2}\right)\left(\frac{|A_4|}{|A_2|}\right)\left(\frac{|C_4|}{|C_2|}\right)\right]|A_1||C_1|$$

$$\sin\varphi_{A_1C_1}+2\left(\frac{P_1}{P_1'}\cos\varphi_{A_1B_1\varepsilon_1}+\frac{P_2}{P_2'}\cos\varphi_{A_1B_1\varepsilon_3}\right)\frac{\xi_1\zeta_1}{\xi_1'^2}|A_1||B_1|-$$

$$2\left(\frac{P_1}{P_1'}\cos\varphi_{A_3B_3\varepsilon_2}+\frac{P_2}{P_2'}\cos\varphi_{A_3B_3\varepsilon_4}\right)\frac{\xi_2\zeta_2}{\xi_2'^2}|A_3||B_3|+$$

$$2\left(\frac{P_1}{P_1'}\cos\varphi_{A_2B_2\gamma_1}+\frac{P_2}{P_2'}\cos\varphi_{A_2B_2\gamma_3}\right)\frac{\xi_1\zeta_1}{\xi_1'^2}|A_2||B_2|-$$

$$2\left(\frac{P_1}{P_1'}\cos\varphi_{A_4B_4\gamma_2}+\frac{P_2}{P_2'}\cos\varphi_{A_4B_4\gamma_4}\right)\frac{\xi_2\zeta_2}{\xi_2'^2}|A_4||B_4|+$$

$$2\left(\frac{P_1}{P_1'}\cos\varphi_{B_1C_1\varepsilon_1}+\frac{P_2}{P_2'}\cos\varphi_{B_1C_1\varepsilon_3}\right)\frac{\xi_1\zeta_1}{\xi_1'^2}|B_1||C_1|-$$

$$2\left(\frac{P_1}{P_1'}\cos\varphi_{B_3C_3\varepsilon_2}+\frac{P_2}{P_2'}\cos\varphi_{B_3C_3\varepsilon_4}\right)\frac{\xi_2\zeta_2}{\xi_2'^2}|B_3||C_3|+$$

$$2\left(\frac{P_1}{P_1'}\cos\varphi_{B_2C_2\gamma_1}+\frac{P_2}{P_2'}\cos\varphi_{B_2C_2\gamma_3}\right)\frac{\xi_1\zeta_1}{\xi_1'^2}|B_2||C_2|-$$

$$2\left(\frac{P_1}{P_1'}\cos\varphi_{B_4C_4\gamma_2}+\frac{P_2}{P_2'}\cos\varphi_{B_4C_4\gamma_4}\right)\frac{\xi_2\zeta_2}{\xi_2'^2}|B_4||C_4|.$$

The parameters $$\left[\left(\frac{|A_2|}{|A_1|}\right)\left(\frac{|C_2|}{|C_1|}\right)\right], \quad (21)$$

-continued $$\left(\frac{|A_4|}{|A_2|}\right)\left(\frac{|C_4|}{|C_2|}\right), \quad (22)$$

$$\left[\left(\frac{|A_3|}{|A_1|}\right)\left(\frac{|C_3|}{|C_1|}\right)\right] \quad (23)$$

need to be determined in order to complete the determination of a conjugated quadratures for certain end use applications. The parameters given by Equations (21), (22), and (23) can for example be measured by procedures analogous to the procedure described for the bi-homodyne detection method with respect to measuring the quantity specified by Equation (5).

The remaining description of the quad-homodyne detection method is the same as corresponding portion of the description given for the bi-homodyne detection method.

It is also evident that since the conjugated quadratures of fields are obtained jointly when using the quad-homodyne detection, there is a significant reduction in the potential for an error in tracking phase as a result of a phase redundancy unlike the situation possible in single-homodyne detection of conjugated quadratures of fields.

There are a number of advantages of the quad-homodyne detection described herein as a consequence of the conjugated quadratures of fields being jointly acquired quantities.

One advantage of the quad-homodyne detection method in relation to the bi-homodyne detection method is a factor of two increase in throughput.

Another advantage is a reduced sensitivity the effects of an overlay error of a spot in or on the substrate that is being imaged and a conjugate image of a pixel of a conjugate set of pixels of a multipixel detector during the acquisition of the four electrical interference signal values of each spot in and/or on a substrate imaged using interferometric far-field and/or near-field confocal microscopy. Overlay errors are errors in the set of four conjugate images of a respective set of conjugate detector pixels relative to the spot being imaged.

Another advantage is that when operating in the scanning mode there is reduced sensitivity to effects of pulse to pulse variations of a respective conjugate set of pulses of the input beam 24 to the interferometer system.

Another advantage is that when operating in the scanning mode there is an increase in throughput since only one pulse of the source is required to generate the four electrical interference values.

Figure 2A:
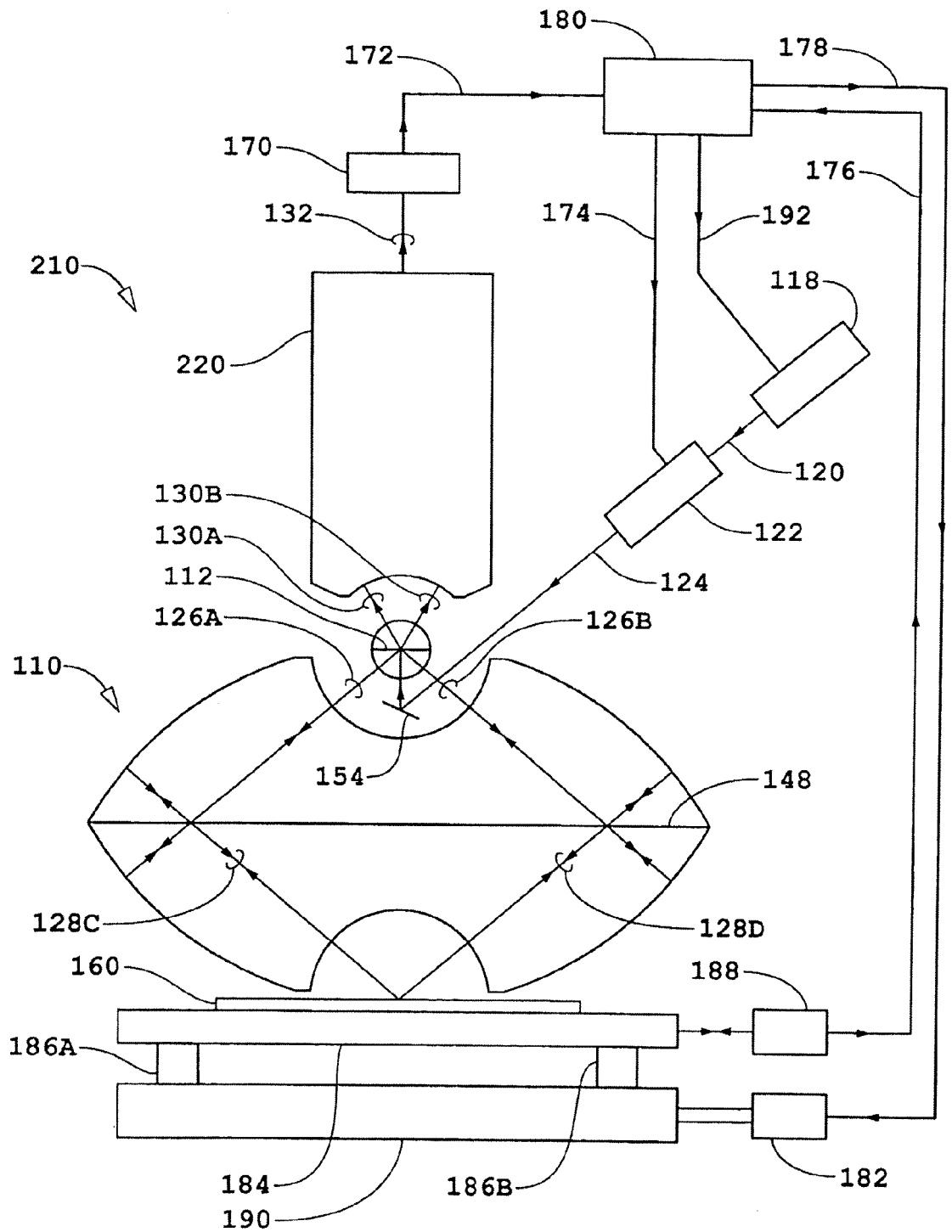
FIG. 2a is a schematic diagram of a confocal microscope system.

A first embodiment is shown schematically in FIG. 2a. The first embodiment comprises a first imaging system generally indicated as numeral 110, pinhole beam-splitter 112, detector 170, and a second imaging system generally indicated as numeral 210. The second imaging system 210 is low power microscope having a large working distance, e.g. Nikon ELWD and SLWD objectives and Olympus LWD, ULWD, and ELWD objectives. The first imaging system 110 comprises the interferometric confocal microscopy system described in cited commonly owned U.S. Provisional Application No. 60/442,982 (ZI-45).

Figure 2B:
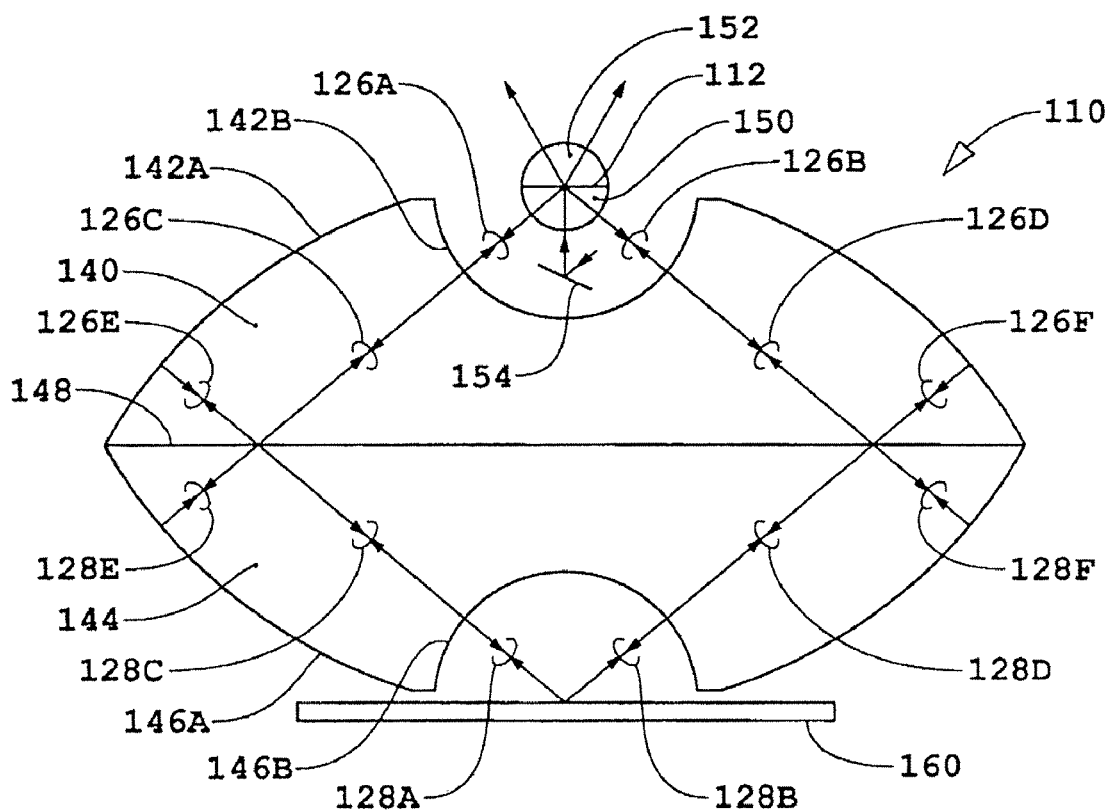
FIG. 2b is a schematic diagram of catadioptric imaging system.

The first imaging system 110 is shown schematically in FIG. 2b. The imaging system 110 is a catadioptric system such as described in commonly owned U.S. Pat. No. 6,552, 852 B1 (ZI-38) entitled "Catoptric and Catadioptric Imaging System" and U.S. patent application Ser. No. 10/366,651 filed Feb. 3, 2003 (ZI-43) and entitled "Catoptric and Catadioptric Imaging System" for which the patent and patent application are by Henry A. Hill and the contents of the patent and patent application are incorporated herein in their entirety by reference.

Catadioptric imaging system 110 comprises catadioptric elements 140 and 144, beam splitter 148, and convex lens 150. Surfaces 142A and 146A are convex spherical surfaces with nominally the same radii of curvature and the respective centers of curvature of surfaces 142A and 146A are conjugate points with respect to beam splitter 148. Surfaces 142B and 146B are concave spherical surfaces with nominally the same radii of curvature. The centers of curvature of surfaces 142B and 146B are the same as the centers of curvature of surfaces 146A and 142A, respectively. The center of curvature of convex lens 150 is the same as the center of curvature of surfaces 142B and 146A. The radius of curvature of surface 146B is selected so as to minimize the loss in efficiency of the imaging system 110 and to produce a working distance for imaging system 110 acceptable for an end use application. The radius of curvature of convex lens 150 is selected so that the off-axis aberrations of the catadioptric imaging system 110 are compensated. The medium of elements 140 and 144 may be for example fused silica or commercially available glass such as SF11. The medium of convex lens 150 may be for example fused silica, YAG, or commercially available glass such as SF11. An important consideration in the selection of the medium of elements 140 and 144 and convex lens 150 will the transmission properties for the frequencies of beam 124.

Figure 2C:
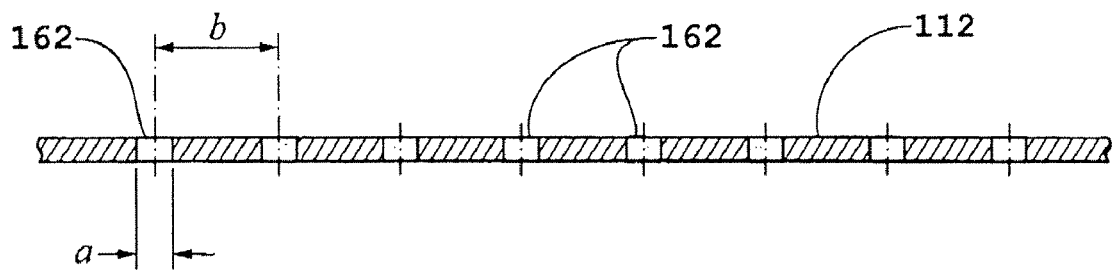
FIG. 2c is a schematic diagram of a pinhole array used in a confocal microscope system.

Convex lens 152 has a center of curvature the same as the center of curvature of convex lens 150. Convex lenses 150 and 152 are bonded together with pinhole beam-splitter 112 in between. Pinhole array beam-splitter 112 is shown in FIG. 2c. The pattern of pinholes in pinhole array beam-splitter is chosen to match the requirements of an end use application. An example of a pattern is a two dimensional array of equally spaced pinholes in two orthogonal directions. The pinholes may comprise circular apertures, rectangular apertures, or combinations thereof such as described in commonly owned U.S. patent application Ser. No. 09/917,402 filed Jul. 27, 2001 (ZI-15) and entitled "Multiple-Source Arrays for Confocal and Near-field Microscopy" by Henry A. Hill and Kyle Ferrio. The contents of the cited patent application are incorporated herein in its entirety by reference. The spacing between pinholes of pinhole array beam-splitter 112 is shown in FIG. 2c as b with aperture size a.

Input beam 124 is reflected by mirror 154 to pinhole beam-splitter 112 where a first portion thereof is transmitted as reference beam components of output beam 130A and 130B and a second portion thereof scattered as measurement beam components of beams 126A and 126B. The measurement beam components 126A and 126B are imaged as components of beams 128A and 128B to an array of image spots in an image plane close to substrate 160. A portion of the components of beams 128A and 128B incident on substrate 160 are reflected and/or scattered as return measurement beam components of beams 128A and 128B. Return measurement beam components of beams 128A and 128B are imaged by catadioptric imaging system 110 to spots that are coincident with the pinholes of pinhole beam-splitter 112 and a portion thereof is transmitted as return measurement beam components of output beams 130A and 130B.

The description of the imaging properties of catadioptric imaging system 110 is the same as the corresponding portion of the description given for the imaging properties of catadioptric imaging system 10 in cited U.S. Provisional Application No. 60/442,982 (ZI-45) and U.S. patent application filed Jan. 27, 2004 entitled "Interferometric Confocal Microscopy Incorporating Pinhole Array Beam-Splitter".

The next step is the imaging of output beams 130A and 130B by imaging system 210 to an array of spots that coincide with the pixels of a multi-pixel detector such as a CCD to generate an array of electrical interference signals 172. The array of electrical interference signals is transmitted to signal processor and controller 180 for subsequent processing.

The description of input beam 124 is the same as corresponding portions of the description given for input beam 24 of FIG. 1a with beam-conditioner 122 configured as a two frequency generator and frequency-shifter shown in FIG. 1c. Input beam 124 comprises two components that have different frequencies and have the same state of plane polarization. The frequency of each component of input beam 124 are shifted between two different preselected frequency values by beam-conditioner 122 according to control signal 174 generated by electronic processor and controller 180. Source 118 of beam 120 to beam-conditioner 122, such as a laser, can be any of a variety of single frequency lasers.

The conjugated quadratures of fields of the return measurement beams are obtained using the bi-homodyne detection as described in the description of FIGS. 1a-1c wherein sets of four measurements of the electrical interference signals 172 are made. For each of the set of four measurements of the electrical interference signals 172, a known sequence of phase shifts is introduced between the reference beam component and the return measurement beam component of output beams 130A and 130B.

The sequence of phase shifts is generated in the first embodiment by shifting the frequencies of components of input beam 124 by beam-conditioner 122. There is a difference in optical path length between the reference beam components and the return beam components of output beams 130A and 130B and as a consequence, a change in frequencies of components of input beam 124 will generate corresponding phase shifts between the reference beam components and the return beam components of output beams 130A and 130B. For an optical path difference L between the reference beam components and the return beam components of output beams 130A and 130B, there will be for a frequency shift $\Delta f$ a corresponding phase shift $\phi$ where $$\varphi = 2\pi L\left(\frac{\Delta f}{c}\right) \quad (24)$$

and c is the free space speed of light. Note that L is not a physical path length difference and depends for example on the average index of refraction of the measurement beam and the return measurement beam paths. For an example of a phase shift $\phi=\pi/2$ and a value of L=0.25 m, the corresponding frequency shift $\Delta f=300$ MHz.

Referring to the quad-homodyne detection method used in various embodiments, a set of four electrical interference signals are obtained for each spot on and/or in substrate 60 being imaged.

Two different modes are described for the acquisition of the electrical interference signals 172. The first mode to be described is a step and stare mode wherein substrate 160 is stepped between fixed locations corresponding to locations where image information is desired. The second mode is a scanning mode. In the step and stare mode for generating a one-dimensional, a two-dimensional or a three-dimensional profile of substrate 160, substrate 160 mounted in wafer chuck 184/stage 190 is translated by stage 190. The position of stage 190 is controlled by transducer 182 according to servo control signal 178 from electronic processor and controller 180. The position of stage 190 is measured by metrology system 188 and position information acquired by metrology system 188 is transmitted to electronic processor and controller 180 to generate an error signal for use in the position control of stage 190. Metrology system 188 may comprise for example linear displacement and angular displacement interferometers and cap gauges.

Electronic processor and controller 180 translates wafer stage 190 to a desired position and then acquires a set of four electrical interference signal values corresponding. After the acquisition of the sequence of four electrical interference signals, electronic processor and controller 180 then repeats the procedure for the next desired position of stage 190. The elevation and angular orientation of substrate 160 is controlled by transducers 186A and 186B.

The second mode for the acquisition of the electrical interference signal values is next described wherein the electrical interference signal values are obtained with the position of stage 190 scanned in one or more directions. In the scanning mode, source 118 is pulsed at times controlled by signal 192 from signal processor and controller 180. Source 118 is pulsed at times corresponding to the registration of the conjugate image of pinholes of pinhole array beam-splitter 112 with positions on and/or in substrate 160 for which image information is desired.

There will be a restriction on the duration or "pulse width" of a beam pulse sequence $\tau_{p1}$ produced by source 120 as a result of the continuous scanning mode used in the third variant of the first embodiment. Pulse width $\tau_{p1}$ will be a parameter that in part controls the limiting value for spatial resolution in the direction of a scan to a lower bound of $$\tau_{p1}v, \quad (25)$$

where v is the scan speed. For example, with a value of $\tau_{p1}=50$ nsec and a scan speed of v=0.20 m/sec, the limiting value of the spatial resolution $\tau_{p1}v$ in the direction of scan will be $$\tau_{p1}v=10 \text{ nm}. \quad (26)$$

Pulse width $\tau_{p1}$ will also determine the minimum frequency difference that can be used in the bi-homodyne detection. In order that there be no contributions to the electrical interference signals from interference between fields of conjugated quadratures, the minimum frequency spacing $\Delta f_{min}$ is expressed as $$\Delta f_{min} \gg \frac{1}{\tau_{p1}}. \quad (27)$$

For the example of $\tau_{p1}=50$ nsec, $1/\tau_{p1}=20$ MHz.

The frequencies of input beam 124 are controlled by signal 174 from signal processor and controller 180 to correspond to the frequencies that will yield the desired phase shifts between the reference and return measurement beam components of output beams 130A and 130B. In the first mode for the acquisition of the electrical interference signals 172, the set of four electrical interference signals corresponding to a set of four electrical interference values are generated by common pixels of detector 170. In the second mode for the acquisition of electrical interference signals 172, a set of four electrical interference signal values are not generated by a common pixel of detector 170. Thus in the second mode of acquisition, the differences in pixel efficiency and the differences in sizes of pinholes in pinhole array beam-splitter 112 are compensated in the signal processing by signal processor and controller 180 as described in the description of the bi-homodyne detection given with respect to FIGS. 1a-1c. The joint measurements of conjugated quadratures of fields are generated by electric processor and controller 180 as previously described in the description of the bi-homodyne detection method.

A second embodiment comprises the interferometer system of FIGS. 1a-1c with interferometer 10 comprising an interferometric far-field confocal microscope such as described in cited U.S. Pat. No. 5,760,901. In the second embodiment, beam-conditioner 22 is configured as the two frequency generator and phase-shifter shown in FIG. 1b. Embodiments in cited U.S. Pat. No. 5,760,901 are configured to operate in either the reflection or transmission mode. The second embodiment has reduced effects of background because of background reduction features of cited U.S. Pat. No. 5,760,901.

A third embodiment comprises the interferometer system of FIGS. 1a-1c with interferometer 10 comprising an interferometric far-field confocal microscope such as described in cited U.S. Pat. No. 5,760,901 wherein the phase masks are removed. In the third embodiment, beam-conditioner 22 is configured as the two frequency generator and phase-shifter shown in FIG. 1b. Embodiments in cited U.S. Pat. No. 5,760, 901 are configured to operate in either the reflection or transmission mode. The third embodiment with the phase masks of embodiments of cited removed U.S. Pat. No. 5,760,901 represent applications of confocal techniques in a basic form.

A fourth embodiment comprises the interferometer system of FIGS. 1a-1c with interferometer 10 comprising an interferometric far-field confocal microscope such as described in cited U.S. Pat. No. 6,480,285 B1. In the fourth embodiment, beam-conditioner 22 is configured as the two-frequency generator and phase-shifter shown in FIG. 1b. Embodiments in cited U.S. Pat. No. 6,480,285 B1 are configured to operate in either the reflection or transmission mode. The fourth embodiment has reduced effects of background because of background reduction features of cited U.S. Pat. No. 6,480, 285 B1.

A fifth embodiment comprises the interferometer system of FIGS. 1a-1c with interferometer 10 comprising an interferometric far-field confocal microscope such as described in cited U.S. Pat. No. 6,480,285 B1 wherein the phase masks are removed. In the fifth embodiment, beam-conditioner 22 is configured as the two-frequency generator and phase-shifter shown in FIG. 1b. Embodiments in cited U.S. Pat. No. 6,480, 285 B1 are configured to operate in either the reflection or transmission mode. The fifth embodiment with the phase masks of embodiments of cited removed U.S. Pat. No. 6,480, 285 B1 represent applications of confocal techniques in a basic form.

A sixth embodiment comprises the interferometer system of FIGS. 1a-1c with interferometer 10 comprising an interferometric near-field confocal microscope such as described in U.S. Pat. No. 6,445,453 entitled "Scanning Interferometric Near-Field Confocal Microscopy" by Henry A. Hill, the contents of which are herein incorporated in their entirety by reference. In the sixth embodiment, beam-conditioner 22 is configured as the two-frequency generator and phase-shifter shown in FIG. 1b. Embodiments in cited U.S. Pat. No. 6,445, 453 are configured to operate in either the reflection or transmission mode. The fifth embodiment of cited U.S. Pat. No. 6,445,453 in particular is configured to operate in the transmission mode with the measurement beam separated from the reference beam and incident on the substrate being imaged by a non-confocal imaging system, i.e., the measurement beam at the substrate is not an image of an array of pinholes but an extended spot. Accordingly, the corresponding embodiments of the sixth embodiment represent an application of bi-homodyne detection method in a non-confocal configuration for the measurement beam.

Interferometer 10 may comprise an interferometric apparatus such as described in U.S. Pat. No. 4,685,803 entitled "Method And Apparatus For The Measurement Of The Refractive Index Of A Gas" or U.S. Pat. No. 4,733,967 entitled "Apparatus Of The Measurement Of The Refractive Index Of A Gas" configured for bi-homodyne detection. Both of the cited patents are by Gary E. Sommargren and the contents of both cited patents are herein incorporated in their entirety by way of reference. Embodiments which comprise interferometric apparatus such as described in the two cited U.S. patents represents configurations of a non-confocal type.

Interferometer 10 may comprise a $\Gamma$ monitor such as described in U.S. Pat. No. 6,124,931 entitled "Apparatus And Methods For Measuring Intrinsic Optical Properties Of A Gas" by Henry A. Hill, the contents of which are here within incorporated in their entirety by way of reference. For embodiments which comprise interferometric apparatus such as described in the cited U.S. patent, the described $\Gamma$ monitor is configured for bi-homodyne detection and the embodiments represent configurations that are of a non-confocal type.

Interferometer 10 may comprise a wavelength monitor such as described in U.S. Patent Provisional Application No. 60/337,459 entitled "A Method For Compensation For Effects Of Non-Isotropic Gas Mixtures In Single-Wavelength And Multiple-Wavelength Dispersion Interferometry" [Z-384, Z-339] by Henry A. Hill, the contents of which are here within incorporated in their entirety by way of reference. For embodiments which comprise interferometric apparatus such as described in the cited U.S. patent, the wavelength monitor is configured for bi-homodyne detection and the embodiments represent configurations that are of a non-confocal type.

Interferometer 10 may further comprise any type of interferometer, e.g., a differential plane mirror interferometer, a double-pass interferometer, a Michelson-type interferometer and/or a similar device such as is described in an article entitled "Differential Interferometer Arrangements For Distance And Angle Measurements: Principles, Advantages And Applications" by C. Zanoni, *VDI Berichte* Nr. 749, 93-106 (1989) configured for bi-homodyne detection. Interferometer 10 may also comprise a passive zero shear plane mirror interferometer as described in U.S. patent application Ser. No. 10/207,314 entitled "Passive Zero Shear Interferometers" or an interferometer with a dynamic beam steering element such as described in U.S. patent application with Ser. No. 09/852, 369 entitled "Apparatus And Method For Interferometric Measurements Of Angular Orientation And Distance To A Plane Mirror Object" and U.S. Pat. No. 6,271,923 entitled "Interferometry System Having A Dynamic Beam Steering Assembly For Measuring Angle And Distance," all of which are by Henry A. Hill. For embodiments which comprise interferometric apparatus such as described in the cited U.S. patents and the article by Zanoni, the described interferometers are configured for bi-homodyne detection and the embodiments represent configurations that are of a non-confocal type. The contents of the article by Zanoni and the three cited patents by Hill are herein incorporated in their entirety by reference. The interferometer can be designed to monitor, for example, changes in optical path length, changes in physical path length, changes in wavelength of a beam, or changes in direction of propagation of a beam.

Interferometer 10 may further comprise a dispersion interferometer such as described in U.S. Pat. No. 6,219,144 B1 entitled "Apparatus and Method for Measuring the Refractive Index and Optical Path Length Effects of Air Using Multiple-Pass Interferometry" by Henry A. Hill, Peter de Groot, and Frank C. Demarest and U.S. Pat. No. 6,407,816 entitled "Interferometer And Method For Measuring The Refractive Index And Optical Path Length Effects Of Air" by Peter de Groot, Henry A. Hill, and Frank C. Demarest. The contents of both of the cited patents are herein incorporated in their entirety by reference. For embodiments which comprise interferometric apparatus such as described in the cited U.S. patents, the described interferometers are configured for bi-homodyne detection and the embodiments represent configurations that are of a non-confocal type.

Other embodiments may use the quad-homodyne detection method instead of the bi-homodyne detection method as variants of the embodiments. For the embodiments that are based on the apparatus shown in FIGS. 1a-1c, the corresponding variants of the embodiments that use the quad-homodyne detection method use variants of the apparatus shown in FIGS. 1a-1c. In the variants of the apparatus such as used in the first embodiment, microscope 220 is modified to include a dispersive element such as a direct vision prism and/or a dichroic beam-splitter. When configured with a dichroic beam-splitter, a second detector is further added to the system. Descriptions of the variants of the apparatus are the same as corresponding portions of descriptions given for corresponding systems in cited U.S. Provisional Application No. 60/442,982 [ZI-45]. Corresponding variants of apparatus are used for embodiments that comprise interferometers such as linear displacement interferometers.

What is claimed is:

1. An interferometery system for making interferometric measurements of an object, said system comprising:
   a beam generation module which during operation delivers an output beam that includes a first beam at a first frequency and a second beam at a second frequency that is different from said first frequency, said first and second beams within the output beam being coextensive, said beam generation module including a beam conditioner which during operation introduces a sequence of different shifts in a selected parameter of each of the first and second beams, said selected parameter selected from a group consisting of phase and frequency;
   a detector assembly having a detector element; and
   an interferometer constructed to receive the output beam at least a part of which represents a first measurement beam at the first frequency and a second measurement beam at the second frequency, said interferometer further constructed to image both the first and second measurement beams onto a selected spot on the object to produce therefrom corresponding first and second return measurement beams, and to then simultaneously image the first and second return measurement beams onto said detector element.

2. The interferometer system of claim 1 wherein the beam generation module further comprises a beam source which during operation generates a single input beam at a predetermined frequency, and wherein the beam conditioner comprises an optical element that derives the first and second beams from the single input beam.

3. The interferometer system of claim 2 wherein said optical element is an acousto-optic modulator.

4. The interferometer system of claim 1 wherein each of said first and second beams includes a first component and a second component that is orthogonal to the first component, and wherein the beam conditioner is constructed to introduce a first sequence of different discrete phase shifts into a relative phase difference between the first and second components of the first beam and concurrently therewith a second sequence of different discrete phase shifts into the relative phase difference between the first and second components of the second beam.

5. The interferometer system of claim 4 wherein the beam conditioner includes a first phase shifter for introducing the first sequence of different discrete phase shifts into the relative phase difference between the first and second components of the first beam and a second phase shifter for introducing the second sequence of different discrete phase shifts into the relative phase difference between the first and second components of the second beam.

6. The interferometer system of claim 4 wherein the interferometer is characterized by a measurement beam optical path length and a reference beam optical path length and wherein the difference between those two optical path lengths is nominally zero.

7. The interferometer system of claim 4 wherein the interferometer is constructed to generate the first measurement beam from the first component of the first beam and the second measurement beam from the first component of the second beam.

8. The interferometer system of claim 7 wherein the interferometer is further constructed to generate a first reference beam from the second component of the first beam and a second reference beam from the second component of the second beam.

9. The interferometer system of claim 8 wherein the first phase shifter introduces the first sequence of different discrete phase shifts into the second component of the first beam and the second phase shifter introduces the second sequence of different discrete phase shifts into the second component of the second beam.

10. The interferometer system of claim 1 wherein the beam conditioner is constructed to introduce a first sequence of different frequency shifts into the frequency of the first beam and concurrently therewith a second sequence of different frequency shifts into the frequency of the second beam.

11. The interferometer system of claim 10 wherein the beam conditioner includes a first set of acousto-optic modulators for introducing the first sequence of different frequency shifts into the frequency of the first beam and a second set of acousto-optic modulators for introducing the second sequence of different frequency shifts into the frequency of the second beam.

12. The interferometer system of claim 10 wherein the interferometer is characterized by a measurement beam optical path length and a reference beam optical path length and wherein the difference between those two optical path lengths is nominally a non-zero value.

13. The interferometer system of claim 1 further comprising a controller which controls the beam conditioner and causes said beam conditioner to introduce the first and second sequences of different shifts in the selected parameter of each of the first and second beams.

14. The interferometer system of claim 13 wherein the controller is programmed to acquire from the detector assembly measured values for a set of interference signals resulting from introducing the first and second sequences of different shifts in the selected parameters of each of the first and second beams and further programmed to compute first and second components of conjugated quadratures of the fields of beams from said selected spot.

15. The interferometer system of claim 11 wherein said detector element is characterized by a frequency bandwidth and wherein the first and second frequencies are separated by an amount that is larger than the frequency bandwidth of the detector.

16. The interferometer system of claim 1 wherein the interferometer is a scanning interferometric far-field confocal microscope.

17. The interferometer system of claim 1 wherein the interferometer is a scanning interferometric far-field non-confocal microscope.

18. The interferometer system of claim 1 wherein the interferometer is a scanning interferometric near-field confocal microscope.

19. The interferometer system of claim 1 wherein the interferometer is a scanning interferometric near-field non-confocal microscope.

20. The interferometer system of claim 1 wherein the interferometer is a linear displacement interferometer.

21. An interferometry system for making interferometric measurements of an object, said system comprising:
a beam generation module which during operation delivers an output beam that includes a first beam at a first frequency and a second beam at a second frequency that is different from said first frequency, said first and second beams within the output beam being coextensive;
a detector assembly having a detector element that is characterized by a frequency bandwidth, wherein the first and second frequencies are separated by an amount that is larger than the frequency bandwidth of the detector; and
an interferometer constructed to receive the output beam, at least a part of which represents within the interferometer a first measurement beam at the first frequency and a second measurement beam at the second frequency, said interferometer further constructed to simultaneously image both the first and second measurement beams onto a selected spot on or in the object to produce therefrom corresponding first and second return measurement beams, and then to simultaneously image the first and second return measurement beams onto said detector element.

22. The interferometer system of claim 21 wherein said first beam includes a first component and a second component that is orthogonal to the first component and said second beam also includes a first component and a second component that is orthogonal to the first component, and wherein the beam conditioner is constructed to introduce a first sequence of different discrete phase shifts into a relative phase difference between the first and second components of the first beam and concurrently therewith a second sequence of different discrete phase shifts into the relative phase difference between the first and second components of the second beam.

23. The interferometer system of claim 22 wherein the beam conditioner includes a first phase shifter for introducing the first sequence of different discrete phase shifts into the relative phase difference between the first and second components of the first beam and a second phase shifter for introducing the second sequence of different discrete phase shifts into the relative phase difference between the first and second components of the second beam.

24. The interferometer system of claim 21 wherein the beam conditioner is constructed to introduce a first sequence of different frequency shifts into the frequency of the first beam and concurrently therewith a second sequence of different frequency shifts into the frequency of the second beam.

25. A method of performing measurements of an object using an interferometer, said method comprising:
generating an input beam for the interferometer, said input beam including a first beam at a first frequency and a second beam at a second frequency that is different from the first frequency, said first and second beams being coextensive and sharing the same temporal window; and
by using the interferometer and the input beam supplied to the interferometer, jointly measuring two orthogonal components of conjugated quadratures of fields of reflected, scattered, or transmitted beams from a selected spot in and/or on the object.

26. The method of claim 25, wherein the jointly measuring comprises:
deriving a first measurement beam from the first beam;
deriving a second measurement beam from the second beam, wherein the first and second measurement beams are coextensive within the interferometer; and
imaging both the first and second measurement beams on said selected spot.

27. The method of claim 26, wherein imaging both the first and second measurement beams on said selected spot generates a first return measurement beam at the first frequency and a second return measurement beam at the second frequency and wherein the jointly measuring further comprises producing a combined interference signal by interfering the first return measurement beam with a first reference beam that is at the first frequency and by interfering the second return measurement beam with a second reference beam that is at the second frequency.

28. The method of claim 25, wherein the jointly measuring further comprises, for each of a plurality of successive time intervals, introducing a corresponding different shift in a selected parameter of the first beam and introducing a different corresponding shift in the selected parameter of the second beam, said selected parameters are selected from a group consisting of phase and frequency.

29. The method of claim 28, wherein the jointly measuring further comprises:
for each of the plurality of successive time intervals, measuring a value of the combined interference signal; and
from the measured values of the combined interference signal for the plurality of successive time internals, computing the two orthogonal components of conjugated quadratures.

30. The method of claim 28, wherein each of said first and second beams includes a first component and a second component that is orthogonal to the first component, wherein the selected parameter of the first beam is the phase of the second component, and wherein the selected parameter of the second beam is the phase of the second component.

31. The method of claim 28, wherein the selected parameter of the first beam is the frequency of the first beam, and wherein the selected parameter of the second beam is the frequency of the second beam.

32. A method of performing measurements of an object using an interferometer, said method comprising:
generating a source beam for the interferometer, said source beam including a first input beam at a first frequency and a second input beam at a second frequency that is different from the first frequency, said first and second input beams being coextensive and sharing the same temporal window function;
by using the source beam supplied to the interferometer, making a sequence of measurements of an interference signal for a selected spot on or in the object, wherein the making of the sequence of measurements involves, for each measurement of the sequence of measurements, introducing a corresponding different shift in a selected parameter of the first input beam and a corresponding different shift in the selected parameter of the second input beam, wherein selected parameter is selected from the group consisting of phase and frequency, and wherein each of said sequence of measurements simultaneously captures information for both conjugated quadratures of fields of reflected, scattered, or transmitted beams from the selected spot.

33. A method of claim 32 wherein the making of the sequence of measurements comprises:
deriving a first measurement beam from the first input beam;
deriving a second measurement beam from the second input beam;
imaging the first and second measurement beams on a selected spot on or in the object to produce corresponding first and second return measurement beams;
interfering the first and second return measurement beams with respective first and second reference beams to produce a combined interference signal; and
making a sequence of measurements of the combined interference signal.

34. A method of performing measurements of an object using a scanning confocal interferometer in which there is an array of pinholes, said method comprising:
generating an input beam for the scanning interferometer, said input beam including a first beam at a first frequency and a second beam at a second frequency that is different from the first frequency, said first and second beams being coextensive and sharing the same temporal window function;
causing an image of the array of pinholes to scan across the object so that each pinhole of a conjugate set of pinholes among the array of pinholes becomes conjugate to a selected spot on or in the object at successive times during the scan;
for each pinhole of the conjugate set of pinholes, measuring an interference signal value for a selected spot on or in the object, wherein the measured interference signal value for each pinhole of the conjugate set of pinholes simultaneously captures information for two orthogonal components of conjugated quadratures of fields of reflected, scattered, or transmitted beams from the selected spot.

35. The method of claim 34 further comprising, from the measured interference signal values for all of the conjugate set of pinholes, computing each of the two orthogonal components of the conjugated quadratures of fields.

36. The method of claim 34 wherein generating the input beam further comprises, for each of a plurality of successive time intervals, introducing a corresponding different shift in a selected parameter of the first beam and introducing a different corresponding shift in the selected parameter of the second beam, said selected parameters are selected from a group consisting of phase and frequency, and wherein each of said sequence of time intervals corresponds to a time at which a different corresponding one of said conjugate set of pinholes is conjugate with said spot.

37. The method of claim 36, wherein each of said first and second beams includes a first component and a second component that is orthogonal to the first component, wherein the selected parameter of the first beam is the phase of the second component, and wherein the selected parameter of the second beam is the phase of the second component.

38. The method of claim 36, wherein the selected parameter of the first beam is the frequency of the first beam, and wherein the selected parameter of the second beam is the frequency of the second beam.

39. A method of performing measurements of an object using a scanning confocal interferometer in which there is an array of pinholes, said method comprising:
generating an input beam for the scanning interferometer, said input beam including a first beam at a first frequency and a second beam at a second frequency that is different from the first frequency, said first and second beams being coextensive and sharing the same temporal window function;
causing an image of the array of pinholes to scan across the object so that each detector element of a conjugate set of detector elements among an array of detector elements becomes conjugate to a selected spot on or in the object at successive times during the scan;
for each detector of the conjugate set of detectors, measuring an interference signal value for a selected spot on or in the object, wherein the measured interference signal value for each detector of the conjugate set of detectors simultaneously captures information for two orthogonal components of conjugated quadratures of fields of reflected, scattered, or transmitted beams from the selected spot.

40. The method of claim 39 further comprising, from the measured interference signal values for all of the conjugate set of detectors, computing each of the two orthogonal components of the conjugated quadratures of fields.

41. The method of claim 39 wherein generating the input beam further comprises, for each of a plurality of successive time intervals, introducing a corresponding different shift in a selected parameter of the first beam and introducing a different corresponding shift in the selected parameter of the second beam, said selected parameters are selected from a group consisting of phase and frequency, and wherein each of said sequence of time intervals corresponds to a time at which a different corresponding one of said conjugate set of detectors is conjugate with said spot.

42. The method of claim 41, wherein each of said first and second beams includes a first component and a second component that is orthogonal to the first component, wherein the selected parameter of the first beam is the phase of the second component, and wherein the selected parameter of the second beam is the phase of the second component.

43. The method of claim 41, wherein the selected parameter of the first beam is the frequency of the first beam, and wherein the selected parameter of the second beam is the frequency of the second beam.

* * * * *